US008138261B2

(12) United States Patent
Matsuzawa et al.

(10) Patent No.: US 8,138,261 B2

(45) Date of Patent: Mar. 20, 2012

(54) PHOTOCATALYST-CONTAINING WATER-BASED CURABLE COATING COMPOSITIONS AND PROCESS FOR PRODUCTION THEREOF

(75) Inventors: Hiroshi Matsuzawa, Takaishi (JP); Hiroyuki Hidaka, Takaishi (JP); Tokio Goto, Takaishi (JP)

(73) Assignee: DIC Corporation, Tokyo (JP)

( * ) Notice: Subject to any disclaimer, the term of this patent is extended or adjusted under 35 U.S.C. 154(b) by 309 days.

(21) Appl. No.: 12/374,934

(22) PCT Filed: Jul. 23, 2007

(86) PCT No.: PCT/JP2007/064422

§ 371 (c)(1), (2), (4) Date: Jul. 24, 2009

(87) PCT Pub. No.: WO2008/013136

PCT Pub. Date: Jan. 31, 2008

(65) Prior Publication Data

US 2010/0010145 A1 Jan. 14, 2010

(30) Foreign Application Priority Data

Jul. 27, 2006 (JP) ................................. 2006-204550
Feb. 28, 2007 (JP) ................................. 2007-049424

(51) Int. Cl.
*C08L 83/04* (2006.01)

(52) U.S. Cl. ........................................ 524/588; 524/780

(58) Field of Classification Search .................. 524/588, 524/780

See application file for complete search history.

(56) References Cited

U.S. PATENT DOCUMENTS 6,268,440 B1 7/2001 Kudo et al.

FOREIGN PATENT DOCUMENTS

| | | |
|---|---|---|
| JP | 10036514 | 2/1998 |
| JP | 10176117 | 6/1998 |
| JP | 11001620 | 1/1999 |
| JP | 11279408 | 10/1999 |
| JP | 2000110272 | 4/2000 |
| JP | 2001072925 | 3/2001 |
| JP | 10182980 | 8/2001 |
| JP | 2002097368 | 4/2002 |
| JP | 2003155446 | 5/2003 |
| JP | 2004238418 | 8/2004 |
| JP | 2004359902 | 12/2004 |

*Primary Examiner* — Kuo-Liang Peng

(74) *Attorney, Agent, or Firm* — Edwards Wildman Palmer LLP; James E. Armstrong, IV; Junko Harada

(57) ABSTRACT

The present invention provides a photocatalyst-containing water-based curable coating composition capable of forming a cured coating film having an excellent durability against the oxidative decomposition effect caused by the photocatalyst, and an excellent crack resistance, as well as excellent weather resistance and stain resistance; and a method for producing the coating composition. Specifically, the present invention provides a photocatalyst-containing water-based curable coating composition comprising: one of a water-based dispersion (X1) or a water-based dispersion (X2), which includes a water-based medium, a polymer segment (A) having a neutralized acid group, a polysiloxane segment (B) forming a composite resin (AB) by chemically bonding with the polymer segment (A), a polysiloxane segment (C) derived from an alkyltrialkoxysilane condensate (c) with an alkyl group of 1 to 3 carbon atoms, the polysiloxane segment (C) forming a composite resin (ABC) by coupling with the polymer segment (A) and the polysiloxane segment (B) via silicon-oxygen bonds, and fine particles of a photocatalytic oxide (D), wherein the water-based dispersion (X1) is formed by dispersing or dissolving the composite resin (ABC) and dispersing the fine particles of a photocatalytic oxide (D) in the water-based medium, the water-based dispersion (X2) is formed by dispersing resin particles in a water-based medium, the resin particles formed by the encapsulation of the fine particles of a photocatalytic oxide (D) within the composite resin (ABC); and a curing agent (E) for curing the composite resin (ABC), and a method for producing the coating composition.

18 Claims, No Drawings

PHOTOCATALYST-CONTAINING WATER-BASED CURABLE COATING COMPOSITIONS AND PROCESS FOR PRODUCTION THEREOF

CROSS-REFERENCE TO PRIOR APPLICATION

This is the U.S. National Phase Application under 35 U.S.C. §371 of International Patent Application No. PCT/JP2007/064422 filed Jul. 23, 2007, which claims the benefit of Japanese Patent Application Nos. 2006-204550 filed Jul. 27, 2006 and 2007-049424 filed Feb. 28, 2007, all of which are incorporated by reference herein. The International Application was published in Japanese on Jan. 31, 2008 as WO2008/013136 A1 under PCT Article 21(2).

TECHNICAL FIELD

The present invention relates to a photocatalyst-containing water-based curable coating composition that can be applied to coating materials or the like in various fields such as the field of architecture, and also relates to a method for producing the coating composition.

BACKGROUND ART

In recent years, a photocatalytic material is attracting attention in various fields typified by the field of exterior construction as a material having a self-cleaning function, due to the oxidative decomposition effect or effect of rendering a superhydrophilic surface, caused by the irradiation of sunlight. Moreover, a photocatalytic material is also attracting attention as a useful material, in the environmental context, to potentially decompose hazardous materials including the harmful gases such as NOx in the atmosphere and the environmental hormones in water or the like. As coating compositions containing a photocatalytic material, a solvent-based coating material and a water-based coating material have been reported to date. Among them, the water-based coating material has been preferably used in various fields in view of its low impact on the environment.

A photocatalyst-containing water-based curable coating composition is composed of a photocatalytic material and a binder resin. However, when a common organic resin such as an acrylic resin and a vinyl chloride resin is used as the binder resin, organic matter decomposes due to the oxidative decomposition effect caused by the photocatalytic material. As a result, the coating films formed by the coating composition containing these organic resins were associated with the problem of reduced durability. Accordingly, as a binder resin having resistance to the oxidative decomposition effect caused by the photocatalytic material, inorganic resins such as silicon resins, and inorganic-organic composite resins composed of an inorganic component and an organic component, or the like have been proposed to date, and have been used suitably in various fields.

Photocatalyst-containing water-based coating compositions capable of forming the coating films with excellent durability as well as excellent solvent resistance, water resistance, weather resistance, stain resistance, or the like have been proposed to date. For example, a coating composition has been disclosed which is formed by a water-based medium, in which organosilane, a polymer having a silyl group containing a silicon atom bonded with a hydrolyzable group and/or a hydroxyl group, and a photocatalyst are dispersed (for example, refer to Patent Document 1).

However, in the coating composition described in the following Patent Document 1, the compatibility between polysiloxane serving as an inorganic component and an organic polymer serving as an organic component is poor. Moreover, crosslinking reaction proceeds only among the polysiloxane portion and not within the portion of polymers other than polysiloxane. As a result, it is difficult to form a coating film with excellent long term durability or weather resistance using the above coating composition.

[Patent Document 1] Japanese Unexamined Patent Application, First Publication No. 2001-072925

DISCLOSURE OF INVENTION

Problems to be Solved by the Invention

Accordingly, an object of the present invention is to provide a photocatalyst-containing water-based curable coating composition capable of forming a cured coating film having a durability against the oxidative decomposition effect caused by the photocatalyst, and an excellent crack resistance after the film formation, as well as excellent weather resistance and stain resistance, and also to provide a method for producing the coating composition.

Means for Solving the Problems

The present inventors conducted intensive and extensive studies, in order to achieve a two-component curable water-based coating composition capable of forming a cured coating film having a durability against the oxidative decomposition effect caused by the photocatalyst and an excellent crack resistance after the film formation, as well as excellent weather resistance and stain resistance, by using a conventional water-based resin composition with a polysiloxane segment as a base, which is capable of forming a coating film with an excellent long term weather resistance as well as an excellent solvent resistance, acid resistance, or the like.

During their intensive and extensive studies, the present inventors discovered the following to complete the present invention:

A cured coating film having a durability against the oxidative decomposition effect caused by the photocatalyst and an excellent crack resistance after the film formation, as well as having excellent weather resistance and stain resistance can be formed by using a water-based curable coating composition comprising:

one of a water-based dispersion (X1) or a water-based dispersion (X2), which includes a water-based medium, a polymer segment (A) having a neutralized acid group, a polysiloxane segment (B) forming a composite resin (AB) by chemically bonding with the polymer segment (A), a polysiloxane segment (C) derived from an alkyltrialkoxysilane condensate (c) with an alkyl group of 1 to 3 carbon atoms, the polysiloxane segment (C) forming a composite resin (ABC) by coupling with the polymer segment (A) and the polysiloxane segment (B) via silicon-oxygen bonds, and fine particles of a photocatalytic oxide (D), wherein the water-based dispersion (X1) is formed by dispersing or dissolving the composite resin (ABC) and dispersing the fine particles of a photocatalytic oxide (D) in the water-based medium, the water-based dispersion (X2) is formed by dispersing resin particles in a water-based medium, the resin particles formed by the encapsulation of the fine particles of a photocatalytic oxide (D) within the composite resin (ABC); and a curing agent (E) which reacts with a functional group contained in the composite resin (ABC), and the water-based curable coating composition can be easily produced by a production method comprising the following (1) to (4):

(1) subjecting a polymer (a'), and organoalkoxysilane (b) and/or a hydrolytic condensation product thereof (b-1) to a hydrolytic condensation process and thereby obtaining a composite resin (A'B), the polymer (a') having a combination of an acid group, a hydroxyl group bonded to a silicon atom, and/or a hydrolyzable group bonded to a silicon atom;

(2) subjecting the obtained composite resin (A'B) and an alkyltrialkoxysilane condensate (c) with an alkyl group of 1 to 3 carbon atoms to a hydrolytic condensation process and thereby obtaining a composite resin (A'BC), followed by the neutralization by a basic compound to obtain a composite resin (ABC), or neutralizing the obtained composite resin (A'B) by a basic compound and thereby obtaining a composite resin (AB), and then hydrolytically condensing an alkyltrialkoxysilane condensate (c) with an alkyl group of 1 to 3 carbon atoms to obtain a composite resin (ABC);

(3) mixing with a water-based medium and thereby dispersing or dissolving the composite resin (ABC), followed by the mixing of fine particles of a photocatalytic oxide (D) or a water-based dispersion thereof to obtain a water-based dispersion; and (4) mixing the obtained water-based dispersion with a curing agent (E) that cures the composite resin (ABC); or by a production method comprising:

(3') mixing the composite resin (ABC) obtained by the aforementioned (1) and (2) with a water-based medium and thereby obtaining a water-based dispersion in which resin particles composed of the composite resin (ABC) are dispersed; and the method also includes, before the aforementioned (3') for dispersing the composite resin (ABC) by mixing the composite resin (ABC) with a water-based medium, mixing fine particles of a photocatalytic oxide (D) with the composite resin (ABC) or a precursor thereof.

That is, the present invention relates to a photocatalyst-containing water-based curable coating composition comprising: one of a water-based dispersion (X1) or a water-based dispersion (X2), which includes a water-based medium, a polymer segment (A) having a neutralized acid group, a polysiloxane segment (B) forming a composite resin (AB) by chemically bonding with the polymer segment (A), a polysiloxane segment (C) derived from an alkyltrialkoxysilane condensate (c) with an alkyl group of 1 to 3 carbon atoms, the polysiloxane segment (C) forming a composite resin (ABC) by coupling with the polymer segment (A) and the polysiloxane segment (B) via silicon-oxygen bonds, and fine particles of a photocatalytic oxide (D), wherein the water-based dispersion (X1) is formed by dispersing or dissolving the composite resin (ABC) and dispersing the fine particles of a photocatalytic oxide (D) in the water-based medium, the water-based dispersion (X2) is formed by dispersing resin particles in a water-based medium, the resin particles formed by the encapsulation of the fine particles of a photocatalytic oxide (D) within the composite resin (ABC); and a curing agent (E) for curing the composite resin (ABC).

Also, the present invention relates to a method for producing a photocatalyst-containing water-based curable coating composition, the method comprising the following (1) to (4):

(1) subjecting a polymer (a'), and organoalkoxysilane (b) and/or a hydrolytic condensation product thereof (b-1) to a hydrolytic condensation process and thereby obtaining a composite resin (A'B), the polymer (a') having a combination of an acid group, a hydroxyl group bonded to a silicon atom, and/or a hydrolyzable group bonded to a silicon atom, the composite resin (A'B) being formed by a chemical bonding between a polymer segment (A') derived from the polymer (a') and a polysiloxane segment (B) derived from the organoalkoxysilane (b);

(2) subjecting the obtained composite resin (A'B) and an alkyltrialkoxysilane condensate (c) with an alkyl group of 1 to 3 carbon atoms to a hydrolytic condensation process and thereby obtaining a composite resin (A'BC), the composite resin (A'BC) being formed by the coupling between a polysiloxane segment (C), which is derived from the alkyltrialkoxysilane condensate (c) with an alkyl group of 1 to 3 carbon atoms, and the polysiloxane segment (B) in the composite resin (A'B) via a silicon-oxygen bond, followed by the neutralization of an acid group within the composite resin (A'BC) by a basic compound to obtain a composite resin (ABC), or neutralizing an acid group within the obtained composite resin (A'B) by a basic compound and thereby obtaining a composite resin (AB), and then hydrolytically condensing an alkyltrialkoxysilane condensate (c) with an alkyl group of 1 to 3 carbon atoms to obtain a composite resin (ABC), the composite resin (ABC) being formed by the coupling between a polysiloxane segment (C), which is derived from the alkyltrialkoxysilane condensate (c) with an alkyl group of 1 to 3 carbon atoms, and the polysiloxane segment (B) in the composite resin (AB) via a silicon-oxygen bond;

(3) mixing the obtained composite resin (ABC) with a water-based medium and thereby dispersing or dissolving the composite resin (ABC), followed by the mixing of fine particles of a photocatalytic oxide (D) or a water-based dispersion thereof to obtain a water-based dispersion (X1), the water-based dispersion (X1) in which the composite resin (ABC) is dispersed or dissolved and the fine particles of a photocatalytic oxide (D) are dispersed; and (4) mixing the obtained water-based dispersion, which is formed of the composite resin (ABC) and the fine particles of a photocatalytic oxide (D), with a curing agent (E) that cures the composite resin (ABC);

or the method comprising:

the above (1) and (2) as well as the following (3'):

(3') mixing the composite resin (ABC) obtained by the aforementioned (2) with a water-based medium and thereby obtaining a water-based dispersion in which resin particles composed of the composite resin (ABC) are dispersed; and the method also includes, before the aforementioned (3') for dispersing the composite resin (ABC) by mixing the composite resin (ABC) with a water-based medium, mixing fine particles of a photocatalytic oxide (D) with the composite resin (ABC) or a precursor thereof.

Effects of the Invention

A photocatalyst-containing water-based curable coating composition of the present invention and a photocatalyst-containing water-based curable coating composition obtained by the production method of the present invention are capable of forming a cured coating film having a durability against the oxidative decomposition effect caused by the photocatalyst, and an excellent crack resistance after the film formation, as well as having excellent weather resistance and stain resistance. Accordingly, by exploiting such features, the present invention can be suitably used in various applications such as a coating material for exterior constructions.

BEST MODE FOR CARRYING OUT THE INVENTION

The present invention will be described in detail below.

A composite resin (ABC) used in the present invention is not limited as long as it is a composite resin composed of a polymer segment (A) having a neutralized acid group; a polysiloxane segment (B) forming a composite resin (AB) by chemically bonding with the polymer segment (A); a polysiloxane segment (C) derived from an alkyltrialkoxysilane condensate (c) with an alkyl group of 1 to 3 carbon atoms, the polysiloxane segment (C) coupled with the polymer segment (A) and the polysiloxane segment (B) via silicon-oxygen bonds. Examples thereof include a composite resin that the polysiloxane segment (B) in a composite resin having a graft structure in which the polysiloxane segment (B) is chemically bonded to a side chain of the polymer segment (A) with a neutralized acid group, or having a block structure in which the polysiloxane segment (B) is chemically bonded to a terminus of the polymer segment (A), is chemically bonded with the polysiloxane segment (C) derived from an alkyltrialkoxysilane condensate (c) with an alkyl group of 1 to 3 carbon atoms via silicon-oxygen bonds.

The chemical bond within the aforementioned composite resin (ABC) that couples the aforementioned polymer segment (A) and the aforementioned polysiloxane segment (B) is not particularly limited. However, examples thereof include the binding modes represented by the following structural formula (S-1) or (S-2), and above all, the use of a composite resin including a binding mode represented by the structural formula (S-1) enables the formation of a coating film with an excellent weather resistance, and is therefore preferable.

[Chemical Formula 1]

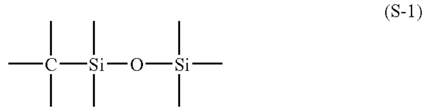

(S-1)

[wherein the carbon atom in the structural formula (S-1) constitutes a part of the aforementioned polymer segment (A) and the silicon atoms and the oxygen atom constitute a part of the aforementioned polysiloxane segment (B)].

[Chemical Formula 2]

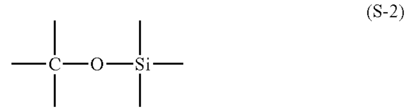

(S-2)

[wherein the carbon atom in the structural formula (S-2) constitutes a part of the aforementioned polymer segment (A) and the silicon atom constitutes a part of the aforementioned polysiloxane segment (B)].

The polymer segment (A) that constitutes the composite resin (ABC) needs to be a polymer segment with a neutralized acid group for dispersing or dissolving the composite resin (ABC) in a water-based medium. Among such polymer segments, a polymer segment derived from a polymer (a') having a hydroxyl group bonded to a silicon atom, and/or a hydrolyzable group bonded to a silicon atom (hereinafter simply abbreviated as "a hydroxyl group and/or a hydrolyzable group bonded to a silicon atom") together with an acid group, or a polymer (a) which is a neutralized product of the polymer (a') is preferable, since the polymer segment chemically binds with the hydroxyl group bonded to a silicon atom or the hydrolyzable group bonded to a silicon atom which is present in the polysiloxane segment (B) or its synthetic raw material, via the binding mode represented by the structural formula (S-1), by readily causing a hydrolytic condensation reaction therewith. The polymer (a') and polymer (a) are not particularly limited as long as they have an acid group or a neutralized acid group and are polymers other than polysiloxane. Examples thereof include vinyl-based polymers such as an acrylic polymer, a fluoroolefin polymer, a vinyl ester polymer, an aromatic vinyl polymer, and a polyolefin polymer; a polyurethane polymer; a polyester polymer; and a polyether polymer. Of these, vinyl-based polymers and a polyurethane polymer are preferable, and an acrylic polymer is more preferable.

Examples of the acid group in the polymer (a') include a carboxyl group, a phosphate group, an acidic phosphate ester group, a phosphite group, a sulfonic acid group, and a sulfinic acid group. Of these, a carboxyl group is preferable since it is easily introduced to the backbone of the composite resin (ABC).

As the basic compound used for neutralizing the above acid group, organic amines such as methylamine, dimethylamine, trimethylamine, ethylamine, diethylamine, triethylamine, 2-aminoethanol, and 2-dimethylaminoethanol; inorganic basic compounds such as ammonia, sodium hydroxide, and potassium hydroxide; and quaternary ammonium hydroxides such as tetramethylammonium hydroxide, tetra-n-butylammonium hydroxide, and trimethylbenzylammonium hydroxide can be used. Of these, organic amines and ammonia (including ammonia water) are preferably used.

The neutralized acid group in the polymer (a) is preferably present within a range of 0.1 to 20% by weight, more preferably within a range of 0.2 to 10% by weight, with respect to 100% by weight of the composite resin (ABC), in view of maintaining a satisfactory storage stability of a water-based dispersion or a water-based solution which is formed by dispersing or dissolving the composite resin (ABC) in a water-based medium.

The hydrolyzable group bonded to a silicon atom in the polymer (a') or polymer (a) is not particularly limited as long as it is a functional group capable of forming a hydroxyl group bonded to a silicon atom (that is, a silanol group) due to the hydrolysis process. Examples thereof include a halogen atom bonded to a silicon atom, an alkoxy group bonded to a silicon atom, an acyloxy group bonded to a silicon atom, a phenoxy group bonded to a silicon atom, a mercapto group bonded to a silicon atom, an amino group bonded to a silicon atom, an amide group bonded to a silicon atom, an aminooxy group bonded to a silicon atom, an iminooxy group bonded to a silicon atom, and an alkenyloxy group bonded to a silicon atom. Of these, an alkoxy group bonded to a silicon atom is preferable since its use enables easy progress of the hydrolysis reaction as well as easy removal of byproducts after the reaction.

The polymer segment (A) may include another functional group other than the neutralized acid group, hydroxyl group bonded to a silicon atom, and hydrolyzable group bonded to a silicon atom, as long as the inclusion does not impair the effects achieved by the present invention. Examples of another functional group include an unneutralized carboxyl group, a blocked carboxyl group, a carboxylic acid anhydride group, a hydroxyl group, a blocked hydroxyl group, a cyclocarbonate group, an epoxy group, a carbonyl group, a primary amide group, a secondary amide group, a carbamate group, a polyethylene glycol group, a polypropylene glycol group, and a group shown by the following structural formula (S-3).

[Chemical Formula 3]

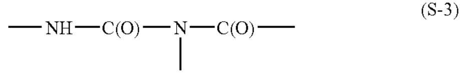

(S-3)

Examples of the polysiloxane segment (B) that constitutes the composite resin (ABC) include a segment derived from a polysiloxane having a hydroxyl group and/or a hydrolyzable group bonded to a silicon atom. Note that as the hydrolyzable group bonded to a silicon atom, the same hydrolyzable groups bonded to a silicon atom described earlier for the polymer segment (A) may be exemplified, and the same also applies to the preferable hydrolyzable groups.

As the polysiloxane segment (B), those having structures shown by the following general formulae (S-4) and (S-5) are preferable. Since the polysiloxane segment having the structures shown by the following general formulae (S-4) and (S-5) includes a three dimensional polysiloxane network structure, a coating film resulting from the use of the segment will have excellent solvent resistance, weather resistance, and the like.

[Chemical Formula 4]

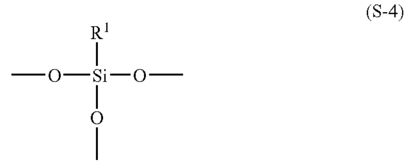

(S-4)

[Chemical Formula 5]

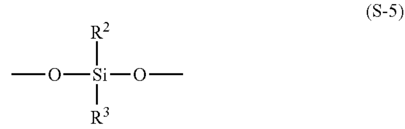

(S-5)

[wherein in the general formulae (S-4) and (S-5), $R^1$ represents an organic group bonded to a silicon atom and having 4 to 12 carbon atoms, $R^2$ and $R^3$ each independently represent a methyl group bonded to a silicon atom or an ethyl group bonded to a silicon atom. As $R^1$, a hydrocarbon group bonded to a silicon atom and having 4 to 12 carbon atoms is preferable, and a phenyl group or an alkyl group of 4 carbon atoms is more preferable. It is preferable that both of $R^2$ and $R^3$ represent either a methyl group bonded to a silicon atom or an ethyl group bonded to a silicon atom, and it is more preferable that both represent a methyl group bonded to a silicon atom.]

Examples of the polysiloxane segment having the structure shown by the above general formulae (S-4) or (S-5) include a segment derived from polysiloxane, which is formed by hydrolytically condensing an organoalkoxysilane, preferably a monoorganotrialkoxysilane having an organic group bonded to a silicon atom and having 4 to 12 carbon atoms (hereinafter simply abbreviated as "an organic group bonded to a silicon atom having 4 to 12 carbon atoms"), and/or a diorganodialkoxysilane having two of a methyl group bonded to a silicon atom and/or an ethyl group bonded to a silicon atom (hereinafter simply abbreviated as "a methyl group and/or ethyl group bonded to a silicon atom"). These polysiloxane segments include an organic group bonded to a silicon atom having 4 to 12 carbon atoms and a hydroxyl group and/or a hydrolyzable group bonded to a silicon atom, and/or two of the methyl group and/or ethyl group bonded to a silicon atom and a hydroxyl group and/or a hydrolyzable group bonded to a silicon atom, and their structures may be any one of linear, branched, and cyclic structures.

Examples of the organic group bonded to a silicon atom having 4 to 12 carbon atoms include an alkyl group, a cycloalkyl group, an aryl group, and an aralkyl group, all of which are bonded to a silicon atom and have 4 to 12 carbon atoms. Note that these organic groups may have a substituent.

As the organic group bonded to a silicon atom having 4 to 12 carbon atoms, a hydrocarbon group bonded to a silicon atom is preferable. Examples thereof include alkyl groups such as an n-butyl group, an isobutyl group, an n-hexyl group, an n-octyl group, an n-dodecyl group, and a cyclohexylmethyl group; cycloalkyl groups such as a cyclohexyl group and a 4-methylcyclohexyl group; aryl groups such as a phenyl group and a 4-methylphenyl group; and aralkyl groups such as a benzyl group; all of which are bonded to a silicon atom. Of these, a phenyl group bonded to a silicon atom or an alkyl group bonded to a silicon atom and having 4 carbon atoms is more preferable.

The polysiloxane segment (C) that constitutes the composite resin (ABC) is a segment derived from an alkyltrialkoxysilane condensate (c) with an alkyl group of 1 to 3 carbon atoms, and the alkyltrialkoxysilane condensate (c) with an alkyl group of 1 to 3 carbon atoms used herein has a hydroxyl group bonded to a silicon atom and/or an alkoxy group bonded to a silicon atom.

As the alkyltrialkoxysilane condensate (c), those having a structure shown by the following general formula (S-6) are preferable. Since the polysiloxane segment derived from the alkyltrialkoxysilane condensate having a structure shown by the following general formula (S-6) includes a three dimensional polysiloxane network structure, a coating film resulting from the use of the segment will have excellent solvent resistance, weather resistance, and the like.

[Chemical Formula 6]

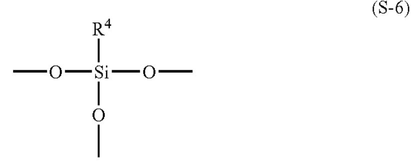

(S-6)

[wherein $R^4$ in the general formula (S-6) represents an alkyl group of 1 to 3 carbon atoms.]

As the composite resin (ABC), those resins are preferable in which the total amount of the polysiloxane segment (B) and the polysiloxane segment (C) derived from an alkyltrialkoxysilane condensate (c) (that is, B+C) is within the range of 25 to 85 parts by weight, more preferably within the range of 45 to 85 parts by weight, with respect to 100 parts by weight of the composite resin (ABC), because the use thereof result in the achievement of a coating film having excellent durability and crack resistance.

In addition, as the composite resin (ABC), those resins are preferable in which the amount of the polysiloxane segment (C) derived from an alkyltrialkoxysilane condensate (c) is within the range of 15 to 60 parts by weight, more preferably within the range of 30 to 60 parts by weight, with respect to 100 parts by weight of the composite resin (ABC), because the use thereof results in the achievement of a coating film having excellent durability and crack resistance.

Although the composite resin (ABC) can be produced by various methods, it is particularly preferable to produce the resin through the following production steps (1) and (2).

(1) A step for subjecting a polymer (a'), and organoalkoxysilane (b) and/or a hydrolytic condensation product thereof (b-1) to a hydrolytic condensation process and thereby obtaining a composite resin (A'B), the polymer (a') having a combination of an acid group, a hydroxyl group and/or a hydrolyzable group bonded to a silicon atom, the composite resin (A'B) being formed by a chemical bonding between a polymer segment (A') derived from the polymer (a') and a polysiloxane segment (B) derived from the organoalkoxysilane (b);

(2) A step for subjecting the obtained composite resin (A'B) and an alkyltrialkoxysilane condensate (c) with an alkyl group of 1 to 3 carbon atoms to a hydrolytic condensation process and thereby obtaining a composite resin (A'BC), the composite resin (A'BC) being formed by the coupling between a polysiloxane segment (C), which is derived from the alkyltrialkoxysilane condensate (c) with an alkyl group of 1 to 3 carbon atoms, and the polysiloxane segment (B) in the composite resin (A'B) via a silicon-oxygen bond, followed by the neutralization of an acid group within the composite resin (A'BC) by a basic compound to obtain a composite resin (ABC), or a step for neutralizing an acid group within the obtained composite resin (A'B) by a basic compound and thereby obtaining a composite resin (AB), and then hydrolytically condensing an alkyltrialkoxysilane condensate (c) with an alkyl group of 1 to 3 carbon atoms to obtain a composite resin (ABC), the composite resin (ABC) being formed by the coupling between a polysiloxane segment (C), which is derived from the alkyltrialkoxysilane condensate (c) with an alkyl group of 1 to 3 carbon atoms, and the polysiloxane segment (B) in the composite resin (AB) via a silicon-oxygen bond.

Although the hydrolytic condensation reaction in the aforementioned production step can be advanced by various methods, a method to advance the reaction by supplying water and a catalyst in the midst of the production step is preferable for its simplicity.

It should be noted that the hydrolytic condensation reaction described earlier refers to a condensation reaction which takes place between hydroxyl groups and hydrolyzable groups, the hydroxyl groups being formed by the hydrolysis of a part of the aforementioned hydrolyzable group due to the effect of water or the like.

The polymer (a') is a polymer having a combination of an acid group, and a hydroxyl group and/or a hydrolyzable group bonded to a silicon atom, and apart from having an unneutralized acid group, it is exactly identical to the polymer (a), which has a combination of a neutralized acid group, and a hydroxyl group and/or a hydrolyzable group bonded to a silicon atom.

When a vinyl-based polymer is used as the polymer (a'), the vinyl-based polymer can be produced by, for example, polymerizing a vinyl monomer containing an acid group, a vinyl monomer containing a hydroxyl group bonded to a silicon atom and/or a vinyl monomer containing a hydrolyzable group bonded to a silicon atom, and, if needed, other vinyl monomers.

Examples of the vinyl monomer containing an acid group include various vinyl monomers containing an acid group such as a carboxyl group, a phosphate group, an acidic phosphate ester group, a phosphite group, a sulfonic acid group, and a sulfinic acid group. Of these, a vinyl monomer containing a carboxyl group or a carboxylic acid anhydride group is preferable.

Examples of the vinyl monomer containing a carboxyl group include unsaturated carboxylic acids such as (meth) acrylic acid, 2-carboxyethyl(meth)acrylate, crotonic acid, itaconic acid, maleic acid, and fumaric acid; anhydrides of unsaturated polycarboxylic acids such as maleic anhydride and itaconic anhydride; anhydrides of unsaturated monocarboxylic acids such as acrylic anhydride and methacrylic anhydride; anhydrides of mixed acids composed of unsaturated carboxylic acids, such as acrylic acid and methacrylic acid, and saturated carboxylic acids, such as acetic acid, propionic acid, and benzoic acid; various monoesters (half esters) composed of saturated dicarboxylic acids, such as monomethyl itaconate, mono-n-butyl itaconate, monomethyl maleate, mono-n-butyl maleate, monomethyl fumarate and mono-n-butyl fumarate, and saturated monohydric alcohols; monovinyl esters of saturated dicarboxylic acids such as monovinyl adipate and monovinyl succinate; products of an addition reaction between anhydrides of saturated polycarboxylic acids, such as succinic anhydride, glutaric anhydride, phthalic anhydride, and trimellitic anhydride, and vinyl-based monomers containing a hydroxyl group bonded to a carbon atom; and various monomers obtained by an addition reaction between the aforementioned monomers containing a carboxyl group and lactones. Of these, unsaturated carboxylic acids such as (meth)acrylic acid are preferable, because they can readily be introduced to vinyl polymers.

In addition, the aforementioned carboxyl group may be a blocked carboxyl group. Examples of the vinyl monomer containing a blocked carboxyl group include vinyl-based monomers containing a silyl ester group such as trimethylsilyl (meth)acrylate, dimethyl-tert-butylsilyl (meth)acrylate, and trimethylsilyl crotonate; monomers containing a hemiacetal ester group or a hemiketal ester group such as 1-ethoxyethyl (meth)acrylate, 2-methoxy-2-(meth)acryloyloxypropane, and 2-(meth)acryloyloxytetrahydrofuran; and monomers containing a tert-butyl ester group such as tert-butyl (meth)acrylate and tert-butyl crotonate.

Examples of the vinyl monomer containing a hydroxyl group bonded to a silicon atom include trihydroxy vinylsilane, ethoxy dihydroxy vinylsilane, diethoxy hydroxy vinylsilane, dichloro hydroxy vinylsilane, 3-(meth)acryloyloxy propyl trihydroxysilane, and 3-(meth)acryloyloxy propyl methyldihydroxysilane.

As the vinyl monomer containing a hydrolyzable group bonded to a silicon atom, for example, a vinyl monomer having a hydrolyzable group shown by the following general formula (S-7) can be used.

[Chemical Formula 7]

$$-\overset{\displaystyle R^5_b}{\overset{|}{Si}}-R^6_{3-b} \tag{S-7}$$

[wherein $R^5$ in the general formula (S-7) represents a monovalent organic group such as an alkyl group, an aryl group, and an aralkyl group; $R^6$ represents a halogen atom, an alkoxy group, an acyloxy group, a phenoxy group, an aryloxy group, a mercapto group, an amino group, an amide group, an aminooxy group, an iminooxy group, and an alkenyloxy group; and b represents an integer of 0 to 2.]

Examples of the vinyl monomer containing a hydrolyzable group shown by the above general formula (S-7) include vinyltrimethoxysilane, vinyltriethoxysilane, vinylmethyldimethoxysilane, vinyltri(2-methoxyethoxy)silane, vinyltriacetoxysilane, vinyltrichlorosilane, 2-trimethoxysilylethylvinyl ether, 3-(meth)acryloyloxy propyl trimethoxysilane, 3-(meth)acryloyloxy propyl triethoxysilane, 3-(meth)acryloyloxy propyl methyldimethoxysilane, and 3-(meth)acryloyloxy propyl trichlorosilane. Of these, vinyltrimethoxysilane and 3-(meth)acryloyloxy propyl trimethoxysilane are preferable since their use enables easy progress of the hydrolysis reaction as well as easy removal of byproducts after the reaction.

In addition, examples of the aforementioned other vinyl monomers include alkyl(meth)acrylates with an alkyl group of 1 to 22 carbon atoms such as methyl(meth)acrylate, ethyl (meth)acrylate, n-propyl(meth)acrylate, n-butyl(meth)acrylate, isobutyl(meth)acrylate, tert-butyl(meth)acrylate, 2-ethylhexyl(meth)acrylate, and lauryl(meth)acrylate; aralkyl (meth)acrylates such as benzyl(meth)acrylate and 2-phenylethyl(meth)acrylate; cycloalkyl(meth)acrylates such as cyclohexyl(meth)acrylate and isobornyl(meth)acrylate; ω-alkoxyalkyl(meth)acrylates such as 2-methoxyethyl (meth)acrylate and 4-methoxybutyl(meth)acrylate; aromatic vinyl-based monomers such as styrene, p-tert-butylstyrene, α-methylstyrene, and vinyl toluene; carboxylic acid vinyl esters such as vinyl acetate, vinyl propionate, vinyl pivalate, and vinyl benzoate; alkyl esters of crotonic acid such as methyl crotonate and ethyl crotonate; dialkyl esters of unsaturated dibasic acids such as dimethyl malate, di-n-butyl malate, dimethyl fumarate, and dimethyl itaconate; α-olefins such as ethylene and propylene; fluoroolefins such as vinylidene fluoride, tetrafluoroethylene, hexafluoropropylene, and chlorotrifluoroethylene; alkyl vinyl ethers such as ethyl vinyl ether and n-butyl vinyl ether; cycloalkyl vinyl ethers such as cyclopentyl vinyl ether and cyclohexyl vinyl ether; monomers containing tertiary amide groups such as N,N-dimethyl(meth)acrylamide, N-(meth)acryloylmorpholine, N-(meth)acryloylpyrrolidine, and N-vinylpyrrolidone;

hydroxyalkyl(meth)acrylates such as 2-hydroxyethyl (meth)acrylate, 2-hydroxypropyl(meth)acrylate, and 4-hydroxybutyl(meth)acrylate; vinyl ethers containing a hydroxyl group such as 2-hydroxyethyl vinyl ether and 4-hydroxybutyl vinyl ether; allyl ethers containing a hydroxyl group such as 2-hydroxyethyl allyl ether and 2-hydroxybutyl allyl ether; addition reaction products of these vinyl-based monomers containing a hydroxyl group bonded to a carbon atom and lactones such as ϵ-caprolactone;

(meth)acrylic acid esters containing a tertiary amino group such as 2-dimethylaminoethyl (meth)acrylate, 2-diethylaminoethyl (meth)acrylate, 2-di-n-propylaminoethyl (meth) acrylate, 3-dimethylaminopropyl (meth)acrylate, 4-dimethylaminobutyl (meth)acrylate, and N-[2-(meth)acryloyloxy] ethyl morpholine; aromatic vinyl-based monomers containing a tertiary amino group such as vinylpyridine, N-vinylcarbazole, and N-vinylquinoline; (meth)acrylamides containing a tertiary amino group such as N-(2-dimethylamino)ethyl (meth)acrylamide, N-(2-diethylamino)ethyl (meth)acrylamide, and N-(2-di-n-propylamino)ethyl (meth) acrylamide; crotonic acid amides containing a tertiary amino group such as N-(2-dimethylamino)ethylcrotonic acid amide and N-(4-dimethylamino)butylcrotonic acid amide; and vinyl ethers containing a tertiary amino group such as 2-dimethylaminoethyl vinyl ether, 2-diethylaminoethyl vinyl ether, and 4-dimethylaminobutyl vinyl ether.

The types and added amount of the aforementioned other vinyl monomers can be appropriately selected depending on the properties imparted to the photocatalyst-containing water-based curable coating composition of the present invention as long as the effects achieved by the present invention are not impaired.

Further, in the aforementioned polymer (a'), one having at least one hydrophilic group selected from the group consisting of an anionic group, a cationic group, and a nonionic group can be used, in order to improve the solubility or dispersibility of the aforementioned composite resin (ABC) in a water-based medium.

The vinyl-based polymer that can be used as the polymer (a') can be produced by, for example, polymerizing a vinyl monomer containing an acid group, a vinyl monomer containing a hydroxyl group bonded to a silicon atom and/or a vinyl monomer containing a hydrolyzable group bonded to a silicon atom, and, if needed, other vinyl monomers through polymerization processes such as a bulk radical polymerization process, a solution radical polymerization process and a non-water-based dispersion radical polymerization process. Of these, because the polymer (a') can be easily produced, it is preferable to adopt a so-called solution radical polymerization process, where a vinyl-based polymer is produced by radically polymerizing the aforementioned vinyl monomers in an organic solvent.

When polymerizing the aforementioned vinyl monomers through the above radical polymerization processes, a polymerization initiator can be used where necessary. Examples of the polymerization initiator include azo compounds such as 2,2'-azobis(isobutyronitrile), 2,2'-azobis(2,4-dimethylvaleronitrile), and 2,2'-azobis(2-methylbutyronitrile); and peroxides such as tert-butyl peroxypivalate, tert-butyl peroxybenzoate, tert-butyl peroxy-2-ethylhexanoate, di-tert-butyl peroxide, cumen hydroperoxide, and diisopropyl peroxycarbonate.

Examples of the organic solvent include aliphatic or alicyclic hydrocarbons such as n-hexane, n-heptane, n-octane, cyclohexane and cyclopentane; aromatic hydrocarbons such as toluene, xylene and ethylbenzene; alcohols such as methanol, ethanol, n-butanol, ethylene glycol monomethyl ether, and propylene glycol monomethyl ether; esters such as ethyl acetate, n-butyl acetate, n-amyl acetate, ethylene glycol monomethyl ether acetate, and propylene glycol monomethyl ether acetate; ketones such as acetone, methyl ethyl ketone, methyl isobutyl ketone, methyl n-amyl ketone, and cyclohexanone; polyalkylene glycol dialkyl ethers such as diethylene glycol dimethyl ether and diethylene glycol dibutyl ether; ethers such as 1,2-dimethoxyethane, tetrahydrofuran, and dioxane; N-methylpyrrolidone; dimethylformamide; dimethylacetamide; and ethylene carbonate. These organic solvents may be used alone or as a combination of two or more kinds thereof.

The polymer (a') is preferably a polymer having a number average molecular weight within the range of 500 to 200,000, more preferably within the range of 700 to 100,000, and particular preferably within the range of 1,000 to 50,000. By using a polymer (a') with a number average molecular weight within the above range, it is possible to prevent the viscosity increase and gelation while producing the composite resin (ABC) and also to form an excellent coating film in terms of durability.

Next, the organoalkoxysilane (b) and/or the hydrolytic condensation product thereof (b-1) used in the aforementioned production step (1) for preparing the polysiloxane segment (B) will be described.

Although the organoalkoxysilane (b) is not particularly limited, monoorganotrialkoxysilane having an organic group of 4 to 12 carbon atoms and diorganodialkoxysilane having two of a methyl group and/or an ethyl group are preferable, since their use enables the production of the composite resin (ABC) with excellent dispersion stability as well as the formation of an excellent coating film in terms of durability.

The hydrolytic condensation product (b-1) of the above organoalkoxysilane (b) is not particularly limited as long as it is a hydrolytic condensation product of the organoalkoxysilane (b). However, one obtained by hydrolytically condensing monoorganotrialkoxysilane having an organic group bonded to a silicon atom and having 4 to 12 carbon atoms or diorganodialkoxysilane having two of a methyl group and/or an ethyl group bonded to a silicon atom is preferable.

Examples of the monoorganotrialkoxysilane containing an organic group bonded to a silicon atom and having 4 to 12 carbon atoms include iso-butyl trimethoxysilane, cyclohexyltrimethoxysilane, phenyltrimethoxysilane, phenyltriethoxysilane, 3-(meth)acryloyloxypropyl trimethoxysilane, and 3-(meth)acryloyloxypropyl triethoxysilane.

Examples of the diorganodialkoxysilane having two of a methyl group and/or an ethyl group bonded to a silicon atom include dimethyldimethoxysilane, dimethyldiethoxysilane, dimethyl-n-butoxysilane, dimethyldiacetoxysilane, diethyldimethoxysilane, and diethyldiacetoxysilane.

Among these organoalkoxysilanes (b), iso-butyl trimethoxysilane, phenyltrimethoxysilane, and dimethyldimethoxysilane are preferable since their use enables easy progress of the hydrolysis reaction as well as easy removal of byproducts after the reaction. Also, these organoalkoxysilanes (b) may be used alone or as a combination of two or more kinds thereof.

It should be noted that although it is possible to use (b-1) alone in the aforementioned production step (1), which is a hydrolytic condensation product of an organoalkoxysilane (b), it is preferable either to use an organoalkoxysilane (b) alone or to use a combination of an organoalkoxysilane (b) and a hydrolytic condensation product thereof (b-1) since the composite resin (A'B) can be easily produced due to a hydrolytic condensation process, and the use of an organoalkoxysilane (b) alone is particularly preferable. The phrase "the use of an organoalkoxysilane (b) alone" used herein refers to a situation where only (an) organoalkoxysilane(s) (b) is used, and thus also includes a case where 2 or more kinds of organoalkoxysilanes (b) are used.

Although the hydrolytic condensation reaction in the aforementioned production step (1) can be advanced by various methods, a method to advance the reaction by supplying water and a catalyst in the midst of the production step (1) is preferable for its simplicity.

Examples of the catalyst include inorganic acids such as hydrochloric acid, sulfuric acid and phosphoric acid; organic acids such as p-toluenesulfonic acid, monoisopropyl phosphate and acetic acid; inorganic bases such as sodium hydroxide and potassium hydroxide; titanic acid esters such as tetraisopropyl titanate and tetrabutyl titanate; compounds containing a basic nitrogen atom such as 1,8-diazabicyclo [5.4.0]undec-7-ene (DBU), 1,5-diazabicyclo[4.3.0]non-5-ene (DBN), 1,4-diazabicyclo[2.2.2]octane (DABCO), tri-n-butylamine, dimethylbenzylamine, monoethanolamine, imidazole, and 1-methylimidazole; quaternary ammonium salts such as tetramethylammonium salt, tetrabutylammonium salt, and dilauryldimethylammonium salt, which have chloride, bromide, carboxylate, hydroxide, or the like as a counter anion; and tin carboxylates such as dibutyltin diacetate, dibutyltin dioctoate, dibutyltin dilaurate, dibutyltin diacetylacetonate, tin octylate and tin stearate. These catalysts may be used alone or as a combination of two or more kinds thereof.

The catalyst is used preferably within a range of 0.0001 to 10 parts by weight with respect to 100 parts by weight of the aforementioned organoalkoxysilane (b) and/or its hydrolytic condensation product (b-1), more preferably within a range of 0.0005 to 3 parts by weight, and particularly preferably within a range of 0.001 to 1 part by weight.

Further, an appropriate amount of the water used for advancing the aforementioned hydrolytic condensation reaction is 0.05 moles or more with respect to one mole of a hydrolyzable group and a hydroxyl group contained in the aforementioned organoalkoxysilane (b) and/or its hydrolytic condensation product (b-1), preferably 0.1 moles or more and particularly preferably within a range of 0.5 to 3.0 moles.

The aforementioned catalyst and water may be supplied all at once or may be supplied sequentially. Alternatively, the catalyst and water may be mixed in advance to supply the mixture.

An appropriate reaction temperature for the aforementioned hydrolytic condensation reaction is within a range of 0 to 150° C. and preferably within a range of 20 to 100° C. In addition, the reaction may be carried out under any conditions in terms of pressure, that is, at normal pressure, under increased pressure, or under reduced pressure.

Alcohols and water, which may develop in association with the hydrolytic condensation reaction as byproducts, may be removed by the methods such as distillation, in cases where they deteriorate the stability of the obtained water-based curable coating composition or the like.

Next, the alkyltrialkoxysilane condensate (c) with an alkyl group of 1 to 3 carbon atoms used in the aforementioned production step (2) for preparing the polysiloxane segment (C) will be described in detail.

Examples of the alkyltrialkoxysilane with an alkyl group of 1 to 3 carbon atoms include methyltrimethoxysilane, methyltriethoxysilane, ethyltrimethoxysilane, ethyltriethoxysilane, n-propyltrimethoxysilane, and iso-propyltrimethoxysilane. Of these, methyltrimethoxysilane and ethyltrimethoxysilane are preferable since their use enables easy progress of the hydrolysis reaction as well as easy removal of byproducts after the reaction. These alkyltrialkoxysilanes may be used alone or as a combination of two or more kinds thereof.

Although the method for obtaining a condensate (c) from the alkyltrialkoxysilane is not particularly limited and thus various methods can be used, a method to advance the hydrolytic condensation reaction by supplying water and a catalyst is preferable for its simplicity.

The water and catalyst used in the above process can be used in the same conditions as those for the hydrolytic condensation reaction described earlier in the production step (1).

Further, in the production step (2), in addition to the alkyltrialkoxysilane condensate (c) with an alkyl group of 1 to 3 carbon atoms, other silane compounds or the hydrolytic condensation products thereof may be used concomitantly.

Examples of other silane compounds include tetrafunctional alkoxysilane compounds such as tetramethoxysilane, tetraethoxysilane, and tetra-n-propoxysilane; and hydrolytic condensation products of the tetrafunctional alkoxysilane compounds. These compounds and hydrolytic condensation products can be used concomitantly as long as the effects achieved by the present invention are not impaired.

When the aforementioned tetrafunctional alkoxysilane compounds or the hydrolytic condensation products thereof are used concomitantly, it is preferable to concomitantly use these compounds and hydrolytic condensation products within a range so that the silicon atoms contained in the tetrafunctional alkoxysilane compounds or the hydrolytic condensation products thereof do not exceed 20 mol % with respect to 100 mol % of the total silicon atoms constituting the aforementioned polysiloxane segments (B) and (C).

The photocatalyst-containing water-based curable coating composition of the present invention is a coating composition containing a water-based dispersion (X1), which is formed by dispersing or dissolving the aforementioned composite resin (ABC) and also dispersing fine particles of a photocatalytic oxide (D) in a water-based medium, or a water-based dispersion (X2), which is formed by dispersing resin particles in a water-based medium, the resin particles formed by the encapsulation of the fine particles of a photocatalytic oxide (D) within the composite resin (ABC); and a curing agent (E) for curing the composite resin (ABC). There is no particular limitation on the method for producing the coating composition, and thus various methods can be adopted. However, when using the water-based dispersion (X1), it is preferable to produce the photocatalyst-containing water-based curable coating composition by producing the composite resin (ABC) by the aforementioned production steps (1) and (2), followed by the production steps (3) and (4) described below. On the other hand, when using the water-based dispersion (X2), it is preferable to produce the photocatalyst-containing water-based curable coating composition by producing the composite resin (ABC) by the aforementioned production steps (1) and (2), followed by a step for mixing fine particles of a photocatalytic oxide (D) with the composite resin (ABC) or a precursor thereof, and the production step (3') described below for dispersing the composite resin (ABC) by mixing the composite resin (ABC) with a water-based medium, in this order.

(3) A step for mixing the composite resin (ABC) obtained in the aforementioned production step (2) with a water-based medium and thereby dispersing or dissolving the composite resin (ABC), followed by the mixing of fine particles of a photocatalytic oxide (D) or a water-based dispersion thereof to obtain a water-based dispersion, in which the composite resin (ABC) is dispersed or dissolved and the fine particles of a photocatalytic oxide (D) are dispersed;

(4) A step for mixing the obtained water-based dispersion, which is formed of the composite resin (ABC) and the fine particles of a photocatalytic oxide (D), with a curing agent (E) for curing the composite resin (ABC); and (3') A step for mixing the composite resin (ABC) obtained by the aforementioned step (2) with a water-based medium and thereby obtaining a water-based dispersion in which resin particles composed of the composite resin (ABC) are dispersed.

When using the water-based dispersion (X2), the time for mixing the composite resin (ABC) or a precursor thereof with the fine particles of a photocatalytic oxide (D) is not limited as long as it is before the step for dispersing the composite resin (ABC) by mixing the composite resin (ABC) with a water-based medium. Examples of the modes for mixing fine particles of a photocatalytic oxide (D) include: (i) the mixing with the polymer (a') before subjecting the polymer (a') and organoalkoxysilane (b) and/or a hydrolytic condensation product thereof (b-1) to a hydrolytic condensation process in the production step (1), the polymer (a') having a combination of an acid group, and a hydroxyl group and/or a hydrolyzable group bonded to a silicon atom; (ii) the mixing with the polymer (a') and organoalkoxysilane (b) and/or a hydrolytic condensation product thereof (b-1) at the time of subjecting the polymer (a') and organoalkoxysilane (b) and/or a hydrolytic condensation product thereof (b-1) to a hydrolytic condensation process in the production step (1); (iii) the mixing with the composite resin (A'B) after subjecting the polymer (a') and organoalkoxysilane (b) and/or a hydrolytic condensation product thereof (b-1) to a hydrolytic condensation process in the production step (1); (iv) the mixing with the composite resin (A'B) and alkyltrialkoxysilane condensate (c) with an alkyl group of 1 to 3 carbon atoms at the time of subjecting the composite resin (A'B) and alkyltrialkoxysilane condensate (c) to a hydrolytic condensation process in the production step (2); (v) the mixing with the composite resin (A'BC) after subjecting the composite resin (A'B) and alkyltrialkoxysilane condensate (c) to a hydrolytic condensation process in the production step (2); (vi) the mixing with the composite resin (ABC) after neutralizing the acid group within the composite resin (A'BC) by a basic compound in the production step (2); (vii) the mixing with the composite resin (AB) after neutralizing the acid group within the composite resin (A'B) by a basic compound in the production step (2); (viii) the mixing with the composite resin (AB) and alkyltrialkoxysilane condensate (c) with an alkyl group of 1 to 3 carbon atoms at the time of subjecting the composite resin (AB) and alkyltrialkoxysilane condensate (c) to a hydrolytic condensation process in the production step (2); and (ix) the mixing with the composite resin (ABC) after subjecting the composite resin (AB) and alkyltrialkoxysilane condensate (c) to a hydrolytic condensation process in the production step (2). Of these, because the resin particles formed by the encapsulation of the fine particles of a photocatalytic oxide (D) can be easily obtained, the mixing modes (iii), (iv), (v), (vi), (vii), (viii), and (ix) are preferable, the mixing modes (iv), (v), (vi), (viii), and (ix) are more preferable, and the mixing modes (vi) and (ix) are most preferable.

Note that in the present invention, the phrase "the resin particles formed by the encapsulation of the fine particles of a photocatalytic oxide (D)" refers to a state where each of the fine particles of a photocatalytic oxide (D) is partially or entirely embedded in the dispersed resin particles composed of the composite resin (ABC). In other words, it is not essential that all the fine particles of a photocatalytic oxide (D) are entirely and completely embedded in the dispersed resin particles composed of the composite resin (ABC), with a proviso that those particles in a state where the fine particles of a photocatalytic oxide (D) are merely supported on the surface of the dispersed resin particles composed of the composite resin (ABC) due to adsorption or adhesion, are excluded from "the resin particles formed by the encapsulation of the fine particles of a photocatalytic oxide (D)" described in the present invention.

Examples of the fine particles of a photocatalytic oxide (D) used in the present invention include fine particles of titanium oxide, zinc oxide, iron oxide, zirconium oxide, tungsten oxide, chromium oxide, molybdenum oxide, germanium oxide, copper oxide, vanadium oxide, manganese oxide, nickel oxide, and ruthenium oxide. These fine particles can be used alone, respectively, or as a combination of two or more kinds thereof. Among these fine particles of a photocatalytic oxide (D), the fine particles of titanium oxide are most preferable since they are chemically stable, harmless, and also highly photocatalytic.

Examples of the forms of the fine particles of a photocatalytic oxide (D) include powdery fine particles of a photocatalytic oxide, sol formed by dispersing fine particles of a photocatalytic oxide in an organic solvent, and a water-based dispersion of fine particles of a photocatalytic oxide. Of these, when used together with the aforementioned water-based dispersion (X1), powdery fine particles of a photocatalytic oxide subjected to a water-based dispersion treatment, sol formed by dispersing fine particles of a photocatalytic oxide in alcohols such as isopropyl alcohol, a water-based dispersion of fine particles of a photocatalytic oxide, and the like are preferable, since they readily disperse in a water-based medium. In addition, when used in the aforementioned water-based dispersion (X2) where the resin particles formed by the encapsulation of the fine particles of a photocatalytic oxide (D) are dispersed, sol formed by dispersing fine particles of a photocatalytic oxide in alcohols is preferable, since the fine particles readily disperse in the resins such as the polymer (a') having a combination of an acid group, and a hydroxyl group and/or a hydrolyzable group bonded to a silicon atom, composite resin (A'B), composite resin (AB), composite resin (A'BC), composite resin (ABC), or the like, due to the mixing therewith. As an organic solvent used in the aforementioned sol formed by dispersing fine particles of a photocatalytic oxide in an organic solvent, for example, alcohols such as methyl alcohol, ethyl alcohol, n-butyl alcohol, isobutyl alcohol, n-propyl alcohol, and isopropyl alcohol are preferable and isopropyl alcohol is particularly preferable. The average particle size of the fine particles of a photocatalytic oxide (D) is usually within a range of 3 to 100 nm, preferably within a range of 3 to 50 nm, and particularly preferably within a range of 4 to 30 nm.

Examples of the aforementioned powdery fine particles of a photocatalytic oxide subjected to a water-based dispersion treatment include powdery titanium oxide manufactured by Ishihara Sangyo Kaisha, Ltd. under the trade name of "ST-01" having an average particle size of 7 nm, powdery titanium oxide manufactured by Ishihara Sangyo Kaisha, Ltd. under the trade name of "ST-21" having an average particle size of 20 nm, and powdery titanium oxide manufactured by Tayca Corporation under the trade name of "AMT-100" having an average particle size of 6 nm. In addition, examples of the aforementioned sol formed by dispersing fine particles of a photocatalytic oxide in an organic solvent include sol formed by dispersing titanium oxide in isopropyl alcohol manufactured by Tayca Corporation under the trade name of "TKD-701" having an average particle size of 6 nm and a titanium oxide content of 17.5% by weight, and sol formed by dispersing titanium oxide in isopropyl alcohol manufactured by Tayca Corporation under the trade name of "TKD-702" having an average particle size of 6 n and a titanium oxide content of 16% by weight. Further, examples of the water-based dispersion of fine particles of a photocatalytic oxide include a water-based dispersion of titanium oxide manufactured by Ishihara Sangyo Kaisha, Ltd. under the trade name of "STS-21" having an average particle size of 20 nm and a titanium oxide content of 40% by weight, and a water-based dispersion of titanium oxide manufactured by Tayca Corporation under the trade name of "TKS-203" having an average particle size of 6 nm and a titanium oxide content of 20% by weight. These can be used alone or as a combination of two or more kinds thereof.

The amount of the fine particles of a photocatalytic oxide (D) used is preferably within the range of 0.1 to 20 parts by weight with respect to 100 parts by weight of the composite resin (ABC), and more preferably within the range of 1 to 10 parts by weight. By using the fine particles of a photocatalytic oxide (D) at the amount within the above range, it is possible to reduce the adverse effects of the fine oxide particles on the obtained coating film in terms of the degradation and deterioration thereof, and also to bring about the self-cleaning function of the coating film by rendering the surface portion of the coating film hydrophilic.

Examples of the aforementioned water-based medium used in the present invention include water, an organic solvent miscible with water, and a mixture thereof. Examples of the organic solvent miscible with water include alcohols such as methanol, ethanol, n-propanol, and isopropanol; ketones such as acetone and methyl ethyl ketone; polyalkylene glycols such as ethylene glycol, diethylene glycol, and propylene glycol; alkyl ethers of polyalkylene glycols; and lactams such as N-methyl-2-pyrrolidone. In the present invention, water may be used alone, a mixture of water and an organic solvent miscible with water may be used, or an organic solvent miscible with water may be used alone. In view of the safety and the impact on the environment, it is preferable to use water alone or to use a mixture of water and an organic solvent miscible with water, and it is particularly preferable to use water alone.

Next, the type of the curing agent used in the present invention for curing the composite resin (ABC) is not limited as long as the curing agent is a compound having a functional group that reacts with the acid group and/or the hydroxyl group bonded to a silicon atom within the composite resin (ABC), and the curing agent can be appropriately selected for use. Examples of the aforementioned functional group that reacts with the acid group and/or the hydroxyl group bonded to a silicon atom include a functional group that reacts with a carboxyl group but also reacts with a hydroxyl group bonded to a silicon atom such as an isocyanate group and a blocked isocyanate group; a functional group that reacts with a carboxyl group such as an epoxy group, a cyclocarbonate group, a hydroxyl group, an oxazoline group, a carbodiimide group, and a hydrazino group; a functional group that reacts with a hydroxyl group bonded to a silicon atom but also reacts with a carboxyl group such as an N-hydroxymethylamino group and an N-alkoxymethylamino group; and a functional group that reacts with a hydroxyl group bonded to a silicon atom such as an amide group, a carboxyl group, a hydroxyl group bonded to a silicon atom and a hydrolyzable group bonded to a silicon atom.

Specific examples of the aforementioned curing agent (E) include a compound having a hydroxyl group and/or a hydrolyzable group bonded to a silicon atom, a compound having an isocyanate group, and a hydroxyl group and/or a hydrolyzable group bonded to a silicon atom, a compound having an epoxy group, and a hydroxyl group and/or a hydrolyzable group bonded to a silicon atom, a polyisocyanate compound, a blocked polyisocyanate compound, a polyepoxy compound, a polycyclocarbonate compound, an amino resin, a compound containing a primary or secondary amide group, a polycarboxy compound, a polyhydroxy compound, a polyoxazoline compound, a polycarbodiimide compound, and a polyhydrazide compound. Of these, a compound having a hydroxyl group and/or a hydrolyzable group bonded to a silicon atom, a compound having an epoxy group, and a hydroxyl group and/or a hydrolyzable group bonded to a silicon atom, a polyisocyanate compound, a blocked polyisocyanate compound, a polyepoxy compound, and a polyoxazoline compound are preferable. These curing agents can be used alone, respectively, or as a combination of two or more kinds thereof. It should be noted that when using the aforementioned preferable curing agents as the curing agent (E), it is also preferable to use a polyhydrazide compound or an amino resin concomitantly with these preferable curing agents.

In addition, when the composite resin (ABC) has a carboxyl group or a neutralized carboxyl group, it is preferable to use a combination of a compound having an epoxy group and a hydroxyl group and/or a hydrolyzable group bonded to a silicon atom, a polyepoxy compound, and a polyoxazoline compound, as the curing agent (E).

Examples of the aforementioned compound having a hydroxyl group and/or a hydrolyzable group bonded to a silicon atom include the same compounds having a hydroxyl group and/or a hydrolyzable group bonded to a silicon atom or the hydrolytic condensation products thereof which are exemplified earlier as the usable compounds at the time of producing the composite resin (ABC).

Examples of the aforementioned compound having an epoxy group and a hydroxyl group and/or a hydrolyzable group bonded to a silicon atom include 3-glycidoxypropyltrimethoxysilane, 3-glycidoxypropylmethyldimethoxysilane, 3-glycidoxypropyltriethoxysilane, 3-glycidoxypropylmethyldiethoxysilane, β-(3,4-epoxycyclohexyl)ethyltrimethoxysilane, a hydrolytic condensation product of the above compounds, and vinyl-based copolymers having an epoxy group and a hydrolyzable silyl group.

Examples of the aforementioned polyisocyanate compound include aromatic diisocyanates such as tolylene diisocyanate and diphenylmethane-4,4'-diisocyanate; aralkyl diisocyanates such as meta-xylylene diisocyanate and α,α,α',α'-tetramethyl-meta-xylylene diisocyanate; and aliphatic or alicyclic diisocyanates such as hexamethylene diisocyanate, lysine diisocyanate, 1,3-bis isocyanatomethyl cyclohexane, 2-methyl-1,3-diisocyanatocyclohexane, 2-methyl-1,5-diisocyanatocyclohexane, and isophorone diisocyanate.

Various prepolymers having an isocyanate group which are obtained by the addition reaction between the aforementioned polyisocyanate compounds and polyhydric alcohols; prepolymers having an isocyanurate ring which are obtained by the cyclization and trimerization of the aforementioned polyisocyanate compounds; polyisocyanates having a biuret structure which are obtained by reacting the aforementioned polyisocyanate compounds with water; and vinyl-based copolymers containing an isocyanate group which are obtained from vinyl-based monomers, which includes a vinyl-based monomer having an isocyanate group as an essential component, the isocyanate group being 2-isocyanatoethyl (meth)acrylate, 3-isopropenyl-α,α-dimethylbenzylisocyanate, (meth)acryloyl isocyanate, or the like.

Examples of the aforementioned blocked polyisocyanate compounds include those obtained by blocking the aforementioned polyisocyanate compounds using various blocking agents. Examples of the blocking agents include alcohols such as methanol, ethanol, and a lactic acid ester; phenolic hydroxyl group-containing compounds such as phenol and a salicylic acid ester; amides such as ε-caprolactam and 2-pyrrolidone; oximes such as acetone oxime and methyl ethyl ketoxime; and active methylene compounds such as methyl acetoacetate, ethyl acetoacetate and acetylacetone.

Examples of the aforementioned polyepoxy compounds include polyglycidyl ethers of aliphatic or alicyclic polyols such as ethylene glycol, hexanediol, neopentyl glycol, trimethylolpropane, pentaerythritol, sorbitol, and hydrogenated bisphenol A; polyglycidyl ethers of aromatic-based diols such as bisphenol A, bisphenol S, and bisphenol F; polyglycidyl ethers of polyether polyols such as polyethylene glycol, polypropylene glycol, and polytetramethylene glycol; polyglycidyl ethers of tris(2-hydroxyethyl)isocyanurate; polyglycidyl esters of aliphatic or aromatic polycarboxylic acids such as adipic acid, butanetetracarboxylic acid, phthalic acid, and terephthalic acid; bisepoxides of hydrocarbon-based dienes such as cyclooctadiene and vinylcyclohexene; alicyclic polyepoxy compounds such as bis(3,4-epoxycyclohexylmethyl) adipate and 3,4-epoxycyclohexylmethyl-3,4-epoxycyclohexylcarboxylate; and vinyl-based copolymers containing two or more epoxy groups.

Examples of the aforementioned polyoxazoline compounds include low-molecular weight poly(1,3-oxazoline) compounds such as 2,2'-p-phenylene-bis(1,3-oxazoline), 2,2'-tetramethylene-bis(1,3-oxazoline), and 2,2'-octamethylene-bis(2-oxazoline); and homopolymers of vinyl-based monomers containing a 1,3-oxazoline group such as 2-isopropenyl-1,3-oxazoline or vinyl-based polymers containing a 1,3-oxazoline group obtained by copolymerizing the above homopolymers with a vinyl-based monomer which is copolymerizable therewith.

Examples of the aforementioned polyhydrazide compounds include dihydrazide compounds of organic acids such as dihydrazide oxalate, dihydrazide malonate and dihydrazide succinate.

Examples of the aforementioned amino resin include various amino resins containing an alkylol group which are obtained by reacting an amino group-containing compound such as melamine, benzoguanamine, acetoguanamine, urea, and glycouril with an aldehyde compound such as formaldehyde and acetaldehyde (or an aldehyde feed material); and amino resins containing an alkoxyalkyl group which are obtained by reacting the amino resin having the alkylol group with a lower alcohol such as methanol, ethanol, n-butanol, and iso-butanol.

When the curing agent (E) is a compound having a hydroxyl group and/or a hydrolyzable group bonded to a silicon atom, a blocked polyisocyanate compound, an amino resin, a compound containing a primary or secondary amide group, or a polycarboxy compound, the curing agent (E) is preferably used at the amount so that the solid content of the curing agent (E) is within a range of 0.1 to 200 parts by weight, with respect to 100 parts by weight of the composite resin (ABC), more preferably within a range of 0.5 to 150 parts by weight, and particularly preferably within a range of 1 to 100 parts by weight.

In addition, when the curing agent (E) is a compound having a group that reacts with a carboxyl group such as a compound having an epoxy group and a hydroxyl group and/or a hydrolyzable group bonded to a silicon atom, a polyepoxy compound, a polycyclocarbonate compound, a polyhydroxy compound, a polyoxazoline compound, a polycarbodiimide compound, or a polyhydrazide compound, and at the same time, the composite resin (ABC) is a composite resin containing a carboxyl group, the curing agent (E) is preferably used so that the amount of a group within the curing agent (E) which reacts with the carboxyl group (that is, an epoxy group, a cyclocarbonate group, a hydroxyl group, a oxazoline group, a carbodiimide group, a hydrazino group, or the like) is within a range of 0.2 to 5.0 equivalent with respect to one equivalent of a carboxyl group within the composite resin (ABC), more preferably within a range of 0.5 to 3.0 equivalent, and particularly preferably within a range of 0.7 to 2.0 equivalent.

Further, when the curing agent (E) is a compound having an isocyanate group and a hydroxyl group and/or a hydrolyzable group bonded to a silicon atom, or a polyisocyanate compound, and at the same time, the composite resin (ABC) is a composite resin having a hydroxyl group and/or a hydrolyzable group bonded to a silicon atom, the curing agent (E) is preferably used so that the amount of the isocyanate group within the curing agent (E) is within a range of 0.1 to 10 equivalent with respect to one equivalent of a hydroxyl group and/or a hydrolyzable group bonded to a silicon atom within the composite resin (ABC), more preferably within a range of 0.3 to 5.0 equivalent, and particularly preferably within a range of 0.5 to 2.0 equivalent.

Also, as the curing agent (E), those which do not easily separate when mixed with a water-based dispersion (X1) or water-based dispersion (X2) are preferable, the water-based dispersion (X1) in which the composite resin (ABC) is dissolved or dispersed and the fine particles of a photocatalytic oxide (D) are dispersed, and the water-based dispersion (X2) in which resin particles are dispersed in a water-based medium, the resin particles being formed by the encapsulation of the fine particles of a photocatalytic oxide (D) within the composite resin (ABC). Examples thereof include the curing agents having a certain level of hydrophilicity which is dispersible or soluble in the water-based medium, and thus uniformly disperse or dissolve in the aforementioned water-based dispersions; and those which cannot disperse or dissolve in the aforementioned water-based medium on their own, but can form integrated particles with the composite resin (ABC) through the penetration, fusion, or adsorption thereto when mixed with the water-based dispersion. Examples of the aforementioned curing agents which uniformly disperse or dissolve in the water-based dispersions include a water-based dispersion of a polyisocyanate compound manufactured by DIC Corporation under the trade name of "Burnock DNW-5000" and having an isocyanate group content of 13.5% by weight and a nonvolatile content of 80% by weight; a water-based self-emulsified dispersion of a blocked polyisocyanate compound manufactured by Daiichi Kogyo Seiyaku Co., Ltd. under the trade name of "Elastron BN-77" and having a solid content of 31% by weight; and an aqueous solution of a water-soluble resin containing a 1,3-oxazoline group manufactured by Nippon Shokubai Co., Ltd. under the trade name of "Epocros WS-500" and having an oxazoline group equivalent of 220 g/eq and a content of 40% by weight, used in the Examples 3, 4, 13, and 20 described later. Also, examples of the aforementioned curing agents which integrate with the composite resin (ABC) when mixed with the water-based dispersion include 3-glycidoxypropyltrimethoxysilane (GPTMS); polymethoxysiloxane manufactured by Mitsubishi Chemical Corporation under the trade name of "MKC Silicate MS-51" and having a condensation degree of 2 to 9; and an epoxy compound manufactured by Nagase ChemteX Corporation under the trade name of "Denacol EX-614B" and having an epoxy equivalent of 173 g/eq, used in the Examples 1, 2, 5 to 12, 14 to 19, and 21 to 27 described later.

In the photocatalyst-containing water-based curable coating composition of the present invention, it is also possible to contain a thermosetting resin where necessary. Examples of the thermosetting resin include a vinyl-based resin, a polyester resin, a polyurethane resin, an epoxy resin, an epoxy ester resin, an acrylic resin, a phenolic resin, a petroleum resin, a ketone resin, a silicon resin, and the modified resins thereof.

In the photocatalyst-containing water-based curable coating composition of the present invention, it is possible to use various inorganic particles of clay minerals, metals, metal oxides, glass, or the like, where necessary. Examples of the metals include gold, silver, copper, platinum, titanium, zinc, nickel, aluminum, iron, silicon, germanium, antimony, and the metal oxides thereof.

In the photocatalyst-containing water-based curable coating composition of the present invention, it is possible to use various additives such as an inorganic pigment, an organic pigment, an extender pigment, a wax, a surfactant, a stabilizer, a fluidity adjusting agent, a dye, a leveling agent, a rheology controlling agent, an ultraviolet absorber, an antioxidant, and a plasticizer, where necessary.

There is no particular limitation on the thickness of a coating film formed by using the photocatalyst-containing water-based curable coating composition of the present invention. However, the thickness is preferably within a range of 0.1 to 50 μm and more preferably within a range of 0.5 to 30 μm. When the thickness of a coating film is within the above range, possible development of cracks on a cured coating film can be prevented, and thus a cured coating film with an excellent durability can be formed.

The photocatalyst-containing water-based curable coating composition of the present invention is applied on a substrate and then cured, as a result of which a coated article can be obtained.

Various materials can be used as the substrate, and examples thereof include a metal substrate, a mineral substrate, a plastic substrate, and a paper-based and a wood-based substrate.

Examples of the metal substrate include various metals such as iron, nickel, aluminum, copper, and lead, alloys of various metals such as stainless steel, and those which are surface-treated by plating or chemical conversion treatment.

Examples of the mineral substrate include those having mineral materials as the major components thereof, such as a cement-based substrate, a silicate-based substrate like calcium silicate, a gypsum-based substrate, and a ceramic-based substrate. Examples of the substrates (wet type) for field construction include exposed concrete, cement mortar, gypsum plaster, dolomite plaster, and lime plaster. Examples of the substrates (dry type) for field product include autoclaved lightweight concrete (ALC), asbestos cement, glass fiber-reinforced calcium silicate, gypsum board, calcined clay such as tiles, and glass.

Examples of the plastic substrates include substrates made of polyolefins such as polyethylene, polypropylene, and ethylene-propylene copolymer; substrates made of polyesters such as polyethylene isophthalate, polyethylene terephthalate, polyethylene naphthalate, and polybutylene terephthalate; substrates made of polyamides such as nylon 1, nylon 11, nylon 6, nylon 66, and nylon MX-D; substrates made of styrene-based polymers such as polystyrene, styrene-butadiene block copolymer, styrene-acrylonitrile copolymer, and styrene-butadiene-acrylonitrile copolymer (ABS resin); substrates made of acrylic-based polymers such as polymethyl methacrylate, and methyl methacrylate-ethyl acrylate copolymer; and substrates made of polycarbonates. The aforementioned plastic substrate may be one having a laminated structure made up of a monolayer or two or more layers. Further, these plastic substrates may be unstretched, or may be subjected to uniaxial stretching or biaxial stretching.

In addition, the aforementioned plastic substrate may contain, where necessary, additives such as an antistatic agent, an antifogging agent, an antiblocking agent, an antioxidant, a light stabilizer, a crystal nucleating agent, and a lubricant, as long as the effects achieved by the present invention are not impaired.

The aforementioned plastic substrate may be surface-treated to further improve the adhesion with the photocatalyst-containing water-based curable coating composition of the present invention. Examples of such surface treatment include a corona discharge treatment, a plasma treatment, a flame plasma treatment, an electron beam irradiation treatment, and an ultraviolet irradiation treatment. These treatments may be conducted alone or may be conducted as a combination of two or more treatments.

There is no particular limitation on the shape of the aforementioned substrates. For example, the substrates may be available in a sheet form, a plate form, a spherical form, or a film form, or it may also be available in large architectural structures, or assembling or molded products with a complicated configuration.

The surface of the substrate may be coated in advance with a render or the like. Further, even when the coated part has deteriorated, it is possible to apply the photocatalyst-containing water-based curable coating composition of the present invention thereon.

Examples of the render include various types of water-soluble coating materials, water-dispersible coating materials, organic solvent-soluble coating materials, organic solvent-dispersible coating materials, and powdered coating materials. More specifically, various types of coating materials can be used, such as an acrylic resin-based coating material, a polyester resin-based coating material, an alkyd resin-based coating material, an epoxy resin-based coating material, a fatty acid-modified epoxy resin-based coating material, a silicone resin-based coating material, a polyurethane resin-based coating material, a fluoroolefin-based coating material, and an amine-modified epoxy resin coating material.

Further, the aforementioned render may be a clear coating material containing no pigments, or it may be an enamel-based coating material containing the aforementioned pigment or a metallic coating material containing aluminum flakes or the like.

As the method for applying the photocatalyst-containing water-based curable coating composition of the present invention on the substrate, various coating methods can be adopted, for example, a brush coating method, a roller coating method, a spray coating method, an immersion coating method, a flow coater coating method, a roll coater coating method, and an electrodeposition coating method.

After applying the photocatalyst-containing water-based curable coating composition of the present invention on the substrate surface through the above coating methods, by leaving the resulting coated article to stand at a normal temperature for about 1 to 10 days or by heating the resulting coated article within a temperature range of 40 to 250° C. for about 10 seconds to 2 hours, a coated article having an excellent coating film in terms of durability, crack resistance, weather resistance, stain resistance, or the like can be obtained.

The aforementioned coated articles include, for example, transportation-related machinery such as automobiles, motorcycles, trains, bicycles, ships, and airplanes, and various types of elements and components used therein; household electric appliances such as television sets, radios, refrigerators, washing machines, air conditioners, outdoor air conditioners, and computers, and various types of elements and components used therein; building materials such as mineral-based clay tiles, metal roofing materials, mineral-based outer wall materials, metal wall materials, metal window frames, metal or wooden doors, and inner wall materials; outdoor constructions such as roads, traffic signs, guard rails, bridges, storage tanks, chimneys, and buildings; packaging materials such as various types of coated films composed of a polyester resin film, an acrylic resin film, a fluororesin film or the like; containers such as plastic bottles and metal cans; and others such as musical instruments, office supplies, sporting goods, and toys made with the aforementioned substrates.

The photocatalyst-containing water-based curable coating composition of the present invention is capable of forming a cured coating film having a particularly excellent durability against the oxidative decomposition effect caused by the photocatalyst, and an excellent crack resistance after the film formation, as well as excellent weather resistance and stain resistance. Accordingly, the present invention can mainly be used as a coating material for automotive topcoat, a coating material for exterior constructions, a coating material for building materials, or the like, or can also be used in various applications such as in an impregnating agent and in a surface treating agent for fibers and papers.

EXAMPLE

Next, the present invention will be specifically described using Examples and Comparative Examples. It should be noted that all of "parts" and "%" in the examples are based on weight, except for those used for describing mirror reflectivity (gloss value) and gloss retention.

Synthesis Example 1

Preparation Example of Methyltrimethoxysilane Condensate (c-1)

1421 parts of methyltrimethoxysilane (MTMS) was fed into a reaction vessel equipped with a stirrer, thermometer, dropping funnel, cooling tube, and nitrogen gas inlet, and the reaction vessel was heated up to 60° C. Subsequently, a mixture composed of 0.17 parts of iso-propyl acid phosphate (manufactured by Sakai Chemical Industry Co., Ltd. under the trade name of "A-3") and 207 parts of deionized water was added dropwise over 5 minutes. After the completion of dropwise addition, the reaction vessel was heated up to 80° C., and the resulting mixture was stirred for 4 hours to conduct a hydrolytic condensation reaction. Then the obtained condensation product was distilled under the conditions of a reduced pressure of 300 down to 10 mmHg (in other words, a condition where the pressure was 300 mmHg at the time of starting evaporation of methanol and then the pressure was reduced down to achieve a final pressure of 10 mmHg. The same applies hereinafter) and a temperature within a range of 40 to 60° C., by which the produced methanol and water were removed to obtain 1,000 parts of a methyltrimethoxysilane condensate (c-1) with a number average molecular weight of 1,000 and an active ingredient of 70.0% in the reaction solution. It should be noted that the above active ingredient in the reaction solution is a value calculated according to a formula in which a theoretical yield (parts by weight) for a case where all the methoxy groups in the silane monomers (such as methyltrimethoxysilane (MTMS) and ethyltrimethoxysilane (ETMS)) are subjected to the hydrolytic condensation reaction is divided by an actual yield (parts by weight) after the hydrolytic condensation reaction [that is, (theoretical yield (parts by weight) for a case where all the methoxy groups in the silane monomers are subjected to the hydrolytic condensation reaction)/(actual yield (parts by weight) after the hydrolytic condensation reaction), and the same applies hereinafter].

Synthesis Example 2

Preparation Example of Ethyltrimethoxysilane Condensate (c-2)

1296 parts of ethyltrimethoxysilane (ETMS) was fed into a reaction vessel similar to that used in Synthesis Example 1, and the reaction vessel was heated up to 60° C. Subsequently, a mixture composed of 0.14 parts of the "A-3" and 171 parts of deionized water was added dropwise over 5 minutes. After the completion of dropwise addition, the reaction vessel was heated up to 80° C., and the resulting mixture was stirred for 4 hours to conduct a hydrolytic condensation reaction. Then the obtained condensation product was distilled under the conditions of a reduced pressure of 300 down to 10 mmHg and a temperature within a range of 40 to 60° C., by which the produced methanol and water were removed to obtain 1,000 parts of an ethyltrimethoxysilane condensate (c-2) with a number average molecular weight of 1,100 and an active ingredient of 70.0% in the reaction solution.

Synthesis Example 3

Preparation Example of Water-Based Dispersion of Composite Resin (ABC-1)

126 parts of propylene glycol monopropyl ether (PnP), 100 parts of phenyltrimethoxysilane (PTMS), and 60 parts of dimethyldimethoxysilane (DMDMS) were fed into a reaction vessel similar to that used in Synthesis Example 1, and the reaction vessel was heated up to 80° C. Subsequently, a mixture containing 26 parts of methyl methacrylate (MMA), 25 parts of butyl methacrylate (BMA), 17 parts of butyl acrylate (BA), 16 parts of acrylic acid (AA), 3 parts of 3-methacryloxypropyl-trimethoxysilane (MPTS), 4.4 parts of PnP, and 4.4 parts of tert-butyl peroxy-2-ethylhexanoate (TBPEH) was added dropwise into the reaction vessel over 4 hours at the same temperature. After the completion of dropwise addition, the resultant was allowed to further react at the same temperature for 2 hours to prepare a polymer (a'-1) with a number average molecular weight of 10,200 and having a combination of a carboxyl group and a hydrolyzable group bonded to a silicon atom. Thereafter, a mixture composed of 0.016 parts of the "A-3" and 45 parts of deionized water was added dropwise over 5 minutes, and the resulting mixture was further stirred for 1 hour at the same temperature to conduct a hydrolytic condensation reaction. As a result, a composite resin (A'B-1) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 229 parts of the methyltrimethoxysilane condensate (c-1) was added thereto, followed by the addition of 59 parts of deionized water and the resulting mixture was further stirred at the same temperature for 16 hours to allow the hydrolytic condensation reaction to proceed, and thereby obtaining a reaction solution containing a composite resin (A'BC-1), in which the aforementioned composite resin (A'B-1) and a polysiloxane segment (C-1) derived from the methyltrimethoxysilane condensate (c-1) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 18 parts of triethylamine (TEA) were added thereto to neutralize the carboxyl group within the composite resin (A'BC-1) to prepare a composite resin (ABC-1). Then by adding 497 parts of deionized water, the composite resin (ABC-1) was dispersed in a water-based medium, thereby obtaining 1,000 parts of a water-based dispersion of the composite resin (ABC-1) with a nonvolatile content of 35.0%.

The storage stability of the obtained water-based dispersion of the composite resin (ABC-1) was evaluated as follows. The storage stability of the water-based dispersion of the composite resin (ABC-1) was 1.0 and was satisfactory.

"Storage stability" was evaluated by a value obtained by measuring the viscosity of the obtained water-based dispersion of the composite resin (ABC) (that is, initial viscosity) and the viscosity thereof after being left to stand at 50° C. for 30 days (that is, viscosity over time), and dividing the value of viscosity over time by the value of initial viscosity (i.e., (viscosity over time)/(initial viscosity)). Roughly speaking, if the storage stability value for the obtained materials is within a range of about 1.0 to 3.0, they may be used as a coating material or the like.

Synthesis Example 4

Preparation Example of Water-Based Dispersion of Composite Resin (ABC-2)

126 parts of PnP, 59 parts of PTMS, and 62 parts of DMDMS were fed into a reaction vessel similar to that used in Synthesis Example 1, and the reaction vessel was heated up to 80° C. Subsequently, a mixture containing 21 parts of MMA, 20 parts of BMA, 14 parts of BA, 13 parts of AA, 2 parts of MPTS, 3.5 parts of PnP, and 3.5 parts of TBPEH was added dropwise into the reaction vessel over 4 hours at the same temperature. After the completion of dropwise addition, the resultant was allowed to further react at the same temperature for 2 hours to prepare a polymer (a'-2) with a number average molecular weight of 10,100 and having a combination of a carboxyl group and a hydrolyzable group bonded to a silicon atom. Thereafter, a mixture composed of 0.016 parts of the "A-3" and 45 parts of deionized water was added dropwise over 5 minutes, and the resulting mixture was further stirred for 1 hour at the same temperature to conduct a hydrolytic condensation reaction. As a result, a composite resin (A'B-2) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 290 parts of the methyltrimethoxysilane condensate (c-1) was added thereto, followed by the addition of 59 parts of deionized water and the resulting mixture was further stirred at the same temperature for 16 hours to allow the hydrolytic condensation reaction to proceed, thereby obtaining a reaction solution containing a composite resin (A'BC-2), in which the aforementioned composite resin (A'B-2) and a polysiloxane segment (C-1) derived from the methyltrimethoxysilane condensate (c-1) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 15 parts of TEA were added thereto to neutralize the carboxyl group within the composite resin (A'BC-2) to prepare a composite resin (ABC-2). Then by adding 497 parts of deionized water, the composite resin (ABC-2) was dispersed in a water-based medium, thereby obtaining 1,000 parts of a water-based dispersion of the composite resin (ABC-2) with a nonvolatile content of 35.1%.

The storage stability of the obtained water-based dispersion of the composite resin (ABC-2) was evaluated in a similar manner to that adopted in Synthesis Example 3. As a result, it was 1.0, and thus was satisfactory.

Synthesis Example 5

Preparation Example of Water-Based Dispersion of Composite Resin (ABC-3)

36 parts of PnP, 80 parts of isopropyl alcohol (IPA), 32 parts of PTMS, and 19 parts of DMDMS were fed into a reaction vessel similar to that used in Synthesis Example 1, and the reaction vessel was heated up to 80° C. Subsequently, a mixture containing 99 parts of MMA, 86 parts of BMA, 67 parts of BA, 16 parts of AA, 5 parts of MPTS, 14 parts of PnP, and 14 parts of TBPEH were added dropwise into the reaction vessel over 4 hours at the same temperature. After the completion of dropwise addition, the resultant was allowed to further react at the same temperature for 2 hours to prepare a polymer (a'-3) with a number average molecular weight of 18,000 and having a combination of a carboxyl group and a hydrolyzable group bonded to a silicon atom. Thereafter, a mixture composed of 0.9 parts of the "A-3" and 24 parts of deionized water was added dropwise over 5 minutes, and the resulting mixture was further stirred for 10 hours at the same temperature to conduct a hydrolytic condensation reaction. As a result, a composite resin (A'B-3) formed of a polymer segment and a polysiloxane segment was obtained, the polymer segment having a combination of a carboxyl group and a hydrolyzable group bonded to a silicon atom, and the polysiloxane segment derived from PTMS and DMDMS. Subsequently, 18 parts of TEA were added thereto to neutralize the carboxyl group within the composite resin (A'B-3) to prepare a composite resin (AB-3), followed by the addition of 124 parts of the methyltrimethoxysilane condensate (c-1) and 550 parts of deionized water thereto. As a result, the formation of a composite resin (ABC-3), in which the aforementioned composite resin (AB-3) and a polysiloxane segment (C-1) derived from the methyltrimethoxysilane condensate (c-1) were bonded, due to the hydrolytic condensation reaction, and the dispersion of the composite resin (ABC-3) in a water-based medium were performed, and thereby obtaining a dispersion of the composite resin (ABC-3).

Then the obtained dispersion was distilled for 2 hours under the conditions of a reduced pressure of 300 down to 10 mmHg and a temperature within a range of 40 to 60° C., by which IPA and the produced methanol and water were removed to obtain 1,000 parts of a water-based dispersion of the composite resin (ABC-3) with a nonvolatile content of 40.0%.

The storage stability of the obtained water-based dispersion of the composite resin (ABC-3) was evaluated in a similar manner to that adopted in Synthesis Example 3. As a result, it was 1.0, and was thus satisfactory.

Synthesis Example 6

Preparation Example of Water-Based Dispersion of Composite Resin (ABC-4)

60 parts of PnP, 50 parts of IPA, 54 parts of PTMS, and 32 parts of DMDMS were fed into a reaction vessel similar to that used in Synthesis Example 1, and the reaction vessel was heated up to 80° C. Subsequently, a mixture containing 40 parts of MMA, 84 parts of BMA, 51 parts of 2-ethylhexyl methacrylate (2-EHMA), 19 parts of AA, 6 parts of MPTS, 10 parts of PnP, and 10 parts of TBPEH was added dropwise into the reaction vessel over 4 hours at the same temperature. After the completion of dropwise addition, the resultant was allowed to further react at the same temperature for 2 hours to prepare a polymer (a'-4) with a number average molecular weight of 17,000 and having a combination of a carboxyl group and a hydrolyzable group bonded to a silicon atom. Thereafter, a mixture composed of 0.9 parts of the "A-3" and 24 parts of deionized water was added dropwise over 5 minutes, and the resulting mixture was further stirred for 10 hours at the same temperature to conduct a hydrolytic condensation reaction. As a result, a composite resin (A'B-4) formed of a polymer segment and a polysiloxane segment was obtained, the polymer segment having a combination of a carboxyl group and a hydrolyzable group bonded to a silicon atom, and the polysiloxane segment derived from PTMS and DMDMS. Subsequently, 21 parts of TEA were added thereto to neutralize the carboxyl group within the composite resin (A'B-4) to prepare a composite resin (AB-4), followed by the addition of 207 parts of the methyltrimethoxysilane condensate (c-1) and 570 parts of deionized water thereto. As a result, the formation of a composite resin (ABC-4), in which the aforementioned composite resin (AB-4) and a polysiloxane segment (C-1) derived from the methyltrimethoxysilane condensate (c-1) were bonded, due to the hydrolytic condensation reaction, and the dispersion of the composite resin (ABC-4) in a water-based medium were performed, and thereby obtaining a dispersion of the composite resin (ABC-4).

Then the obtained dispersion was distilled for 2 hours under the conditions of a reduced pressure of 300 down to 10 mmHg and a temperature within a range of 40 to 60° C., by which IPA and the produced methanol and water were removed to obtain 1,000 parts of a water-based dispersion of the composite resin (ABC-4) with a nonvolatile content of 40.3%.

The storage stability of the obtained water-based dispersion of the composite resin (ABC-4) was evaluated in a similar manner to that adopted in Synthesis Example 3. As a result, it was 1.0, and thus was satisfactory.

Synthesis Example 7

Preparation Example of Water-Based Dispersion of Composite Resin (ABC-5)

1,000 parts of a water-based dispersion of a composite resin (ABC-5) with a nonvolatile content of 40.0% were obtained in a similar manner to that adopted in Synthesis Example 6, except that 207 parts of the ethyltrimethoxysilane condensate (c-2) were used instead of 207 parts of the methyltrimethoxysilane condensate (c-1).

The storage stability of the obtained water-based dispersion of the composite resin (ABC-5) was evaluated in a similar manner to that adopted in Synthesis Example 3. As a result, it was 1.0, and thus was satisfactory.

Comparative Synthesis Example 1

Preparation Example of Water-Based Dispersion of Composite Resin (RAB-1) for Comparison 60 parts of PnP, 365 parts of MTMS, and 32 parts of DMDMS were fed into a reaction vessel similar to that used in Synthesis Example 1, and the reaction vessel was heated up to 80° C. Subsequently, a mixture containing 93 parts of MMA, 53 parts of BA, 27 parts of MPTS, 7 parts of AA, 20 parts of 2-hydroxyethyl methacrylate (2-HEMA), 10 parts of PnP, and 10 parts of TBPEH was added dropwise into the reaction vessel over 4 hours at the same temperature. After the completion of dropwise addition, the resultant was allowed to further react at the same temperature for 2 hours to prepare a polymer (Ra'-1) with a number average molecular weight of 16,000 and having a combination of a carboxyl group and a hydrolyzable group bonded to a silicon atom. Thereafter, a mixture composed of 4.6 parts of the “A-3” and 154 parts of deionized water was added dropwise over 5 minutes, and the resulting mixture was further stirred for 10 hours at the same temperature to conduct a hydrolytic condensation reaction. As a result, a composite resin (RA'B-1) formed of a polymer segment and a polysiloxane segment was obtained, the polymer segment having a combination of a carboxyl group and a hydrolyzable group bonded to a silicon atom, and the polysiloxane segment derived from MTMS and DMDMS. Subsequently, 21 parts of TEA were added thereto to neutralize the carboxyl group within the composite resin (RA'B-1) to prepare a composite resin (RAB-1), followed by the addition of 530 parts of deionized water thereto. As a result, the dispersion of the composite resin (RAB-1) in a water-based medium was performed, and thereby obtaining a dispersion of the composite resin (RAB-1).

Then the obtained dispersion was distilled for 2 hours under the conditions of a reduced pressure of 300 down to 10 mmHg and a temperature within a range of 40 to 60° C., by which the produced methanol and water were removed to obtain 1,000 parts of a water-based dispersion of the composite resin (RAB-1) with a nonvolatile content of 40.3%.

An attempt was made to evaluate the storage stability of the obtained water-based dispersion of the composite resin (RAB-1) in a similar manner to that adopted in Synthesis Example 3. However, the water-based dispersion was gelled after being left to stand for 30 days.

Details of the abovementioned Synthesis Examples 1 to 7 and Comparative Synthesis Example 1 are summarized in the following Tables 1 to 3.

TABLE 1

| | | Synthesis Example 1 | Synthesis Example 2 |
|---|---|---|---|
| Type of silane compound condensate (c) | | c-1 | c-2 |
| Silane compounds (parts) constituting | MTMS | 1421 | |
| polysiloxane segment (C) | ETMS | | 1296 |
| Active Ingredient (%) | | 70.0 | 70.0 |

TABLE 2

| | | Synthesis Example 3 | Synthesis Example 4 | Synthesis Example 5 |
|---|---|---|---|---|
| Type of composite resin (ABC) | | ABC-1 | ABC-2 | ABC-3 |
| Silane compounds (parts) | PTMS | 100 | 59 | 32 |
| constituting polysiloxane | DMDMS | 60 | 62 | 19 |
| segments (B) and (C) | c-1 | 229 | 290 | 124 |
| | c-2 | | | |
| Vinyl monomers (parts) | MMA | 26 | 21 | 99 |
| constituting polymer segment | BMA | 25 | 20 | 86 |
| (A) | BA | 17 | 14 | 67 |
| | AA | 16 | 13 | 16 |
| | MPTS | 3 | 2 | 5 |
| Polymerization initiator (parts) | TBPEH | 4.4 | 3.5 | 14 |
| Segment (B + C)/(A) (weight ratio) | | 75/25 | 80/20 | 30/70 |
| Nonvolatile content (%) | | 35.0 | 35.1 | 40.0 |
| Storage Stability | | 1.0 | 1.0 | 1.0 |

TABLE 3

| | | Synthesis Example 6 | Synthesis Example 7 | Comparative Synthesis Example 1 |
|---|---|---|---|---|
| Type of composite resin (ABC) | | ABC-4 | ABC-5 | RAB-1 |
| Silane compounds (parts) | PTMS | 54 | 54 | |
| constituting polysiloxane | MTMS | | | 365 |
| segments (B) and (C) | DMDMS | 32 | 32 | 32 |
| | c-1 | 207 | | |
| | c-2 | | 207 | |
| Vinyl monomers (parts) | MMA | 40 | 40 | 93 |
| constituting polymer segment | BMA | 84 | 84 | |
| (A) | 2-EHMA | 51 | 51 | |
| | BA | | | 53 |
| | AA | 19 | 19 | 7 |
| | MPTS | 6 | 6 | 27 |
| | 2-HEMA | | | 20 |
| Polymerization initiator (parts) | TBPEH | 10 | 10 | 10 |
| Segment (B + C)/(A) (weight ratio) | | 50/50 | 50/50 | 50/50 |
| Nonvolatile content (%) | | 40.3 | 40.0 | 40.3 |
| Storage Stability | | 1.0 | 1.0 | Gelation |

Footnotes given in Tables 1 to 3 (the same applies to Tables 8 to 11 described later)

"MTMS": Methyltrimethoxysilane
"ETMS": Ethyltrimethoxysilane
"PTMS": Phenyltrimethoxysilane
"DMDMS": Dimethyldimethoxysilane
"MMA": Methyl methacrylate
"BMA": Butyl methacrylate
"2-EUMA": 2-ethylhexyl methacrylate
"BA": Butyl acrylate
"AA": Acrylic acid
"MPTS": 3-methacryloxypropyltrimethoxysilane
"2-HEMA": 2-hydroxyethyl methacrylate
"TBPEH": tert-butyl peroxy-2-ethylhexanoate

Examples 1 to 15 and Comparative Examples 1 to 3

Photocatalyst-containing water-based curable coating compositions were obtained by mixing the following components with the compounding compositions shown in Tables 4 to 7: any one of the water-based dispersions of the composite resins (ABC-1) to (ABC-5) obtained in Synthesis Examples 3 to 7 or the water-based dispersion of the composite resin (RAB-1) obtained in Comparative Synthesis Example 1; a water-based dispersion of titanium oxide manufactured by Tayca Corporation under the trade name of "TKS-203" having an average particle size of 6 nm and a titanium oxide content of 20%; deionized water; 3-glycidoxypropyltrimethoxysilane (GPTMS); polymethoxysiloxane manufactured by Mitsubishi Chemical Corporation under the trade name of "MKC Silicate MS-51" and having a condensation degree of 2 to 9; a water-based dispersion of a polyisocyanate compound manufactured by DIC Corporation under the trade name of "Burnock DNW-5000" and having an isocyanate group content of 13.5% and a nonvolatile content of 80%; a water-based self-emulsified dispersion of a blocked polyisocyanate compound manufactured by Dai-ichi Kogyo Seiyaku Co., Ltd. under the trade name of "Elastron BN-77" and having a solid content of 31%; an epoxy compound manufactured by Nagase ChemteX Corporation under the trade name of "Denacol EX-614B" and having an epoxy equivalent of 173 g/eq; and an aqueous solution of a water-soluble resin containing a 1,3-oxazoline group manufactured by Nippon Shokubai Co., Ltd. under the trade name of "Epocros WS-500" and having an oxazoline group equivalent of 220 g/eq and a content of 40%.

Subsequently, evaluations were made on the cured coating films prepared by using the obtained photocatalyst-containing water-based curable coating compositions according to the following methods. The results are shown in Tables 4 to 7.

"Appearance of coating film": The photocatalyst-containing water-based curable coating composition was coated on a glass plate so as to achieve a cured coating film with a thickness of 2 μm, and allowed to dry for 5 minutes at a temperature of 80° C. Thereafter, the cured coating film was obtained by drying at a temperature of 140° C. for 10 minutes. The obtained cured coating film was subjected to a 2,000 hour-long exposure process using a dew panel light weathemmeter manufactured by Suga Test Instruments Co., Ltd [with an energy of 30 W/m$^2$ at 60° C. at the time of light irradiation, a humidity of 90% or more at 40° C. at the time of wetting, and a (light irradiation/wetting) cycle=4 hours/4 hours]. The condition of the cured coating film was visually observed after the exposure and was compared to that of the cured coating film immediately after the preparation thereof. The conditions were assessed based on the following evaluation criteria.

○: Cured coating film with no development of cracks
Δ: Cured coating film with slight development of cracks
x: Cured coating film with development of cracks The photocatalyst-containing water-based curable coating composition was coated on a chromate-treated aluminum plate manufactured by Engineering Test Service Co., Ltd. so as to achieve a cured coating film with a thickness of 2 μm, and allowed to dry for 5 minutes at a temperature of 80° C. Thereafter, the cured coating film was obtained by drying at a temperature of 140° C. for 10 minutes. The following evaluations (that is, evaluations for pencil hardness, adhesion, solvent resistance, acid resistance, surface hydrophilicity, weather resistance, and stain resistance) were made using the obtained cured coating film.

"Pencil hardness": Measured in accordance with JIS K-5400-6-14.

"Adhesion": Measured in accordance with JIS K-5400 cross-cut adhesion test. 100 grids with 1 mm interval between each of the grids were formed on the cured coating film using a cutter knife, and an adhesive cellophane tape was adhered onto the coating film so as to cover all the grids. Then the adhesive cellophane tape was quickly peeled off, and the number of remaining grids was counted for the evaluation. Evaluation criteria are as follows.

○: No removal of grids
Δ: Grids occupying 1 to 64% of the total grid area were removed
x: Grids occupying 65% or more of the total grid area were removed "Solvent resistance": A felt paper impregnated with methyl ethyl ketone was used to rub back and forth on a cured coating film 50 times, and thereafter, the cured coating film was assessed for the conditions by touching and visual observation. Evaluation criteria are as follows.

○: No softening or gloss reduction was observed
Δ: Softening or gloss reduction was observed to some extent
x: Serious softening or gloss reduction was observed "Acid resistance": A part of the cured coating film was immersed in a 5% aqueous sulfuric acid solution and allowed to stand at 25° C. for 24 hours. Thereafter, the cured coating film was washed with water, and the cured coating film after drying was visually evaluated for the surface conditions. Evaluation criteria are as follows.

○: No etching damages were observed
Δ: Etching damages were observed to some extent
x: Serious etching damages were observed "Surface hydrophilicity": The above cured coating film was subjected to a 200 hour-long exposure process using a dew panel light weathermeter manufactured by Suga Test Instruments Co., Ltd [with an energy of 30 W/m$^2$ at 60° C. at the time of light irradiation, a humidity of 90% or more at 40° C. at the time of wetting, and a (light irradiation/wetting) cycle=4 hours/4 hours]. The contact angle of the cured coating film with water after the exposure was measured using a Drop Master 700 (trade name) manufactured by Kyowa Interface Science Co., Ltd.

"Weather resistance": The obtained cured coating film was subjected to a 2,000 hour-long exposure process using a dew panel light weathermeter manufactured by Suga Test Instruments Co., Ltd [with an energy of 30 W/m$^2$ at 60° C. at the time of light irradiation, a humidity of 90% or more at 40° C. at the time of wetting, and a (light irradiation/wetting) cycle=4 hours/4 hours]. The weather resistance of the cured coating film was evaluated by calculating the retention (%) of the mirror reflectivity (gloss value) of the cured coating film after the exposure with respect to the mirror reflectivity (gloss value) of the cured coating film before the exposure (that is, the gloss retention (%) calculated by the following formula: [(100×mirror reflectivity of the cured coating film after the exposure)/(mirror reflectivity of the cured coating film before the exposure)]). Larger retention values indicate better weather resistance.

"Stain resistance": The cured coating film was subjected to a 3 month-long exposure process by being placed outdoors. The stain resistance of the cured coating film was evaluated by the color difference (ΔE) between the exposed and unwashed coating film and the coating film before the exposure. Smaller color difference (ΔE) values indicate better stain resistance.

TABLE 4

| | | Example | | | | |
|---|---|---|---|---|---|---|
| | | 1 | 2 | 3 | 4 | 5 |
| Compounding composition (parts) | Composite resin (ABC-1) | 100 | 100 | 100 | 100 | 100 |
| | TKS-203 | 8.8 | 8.8 | 8.8 | 8.8 | 8.8 |
| | Deionized water | 97 | 97 | 97 | 97 | 97 |
| | GPTMS | 5.4 | | | | |
| | MS51 | | 7.0 | | | |
| | DNW-5000 | | | 8.5 | | |
| | BN-77 | | | | 20 | |
| | EX-614B | | | | | 4.1 |
| Performance of coating film | Appearance of coating film (immediately after preparation) | ○ | ○ | ○ | ○ | ○ |
| | Appearance of coating film (after exposure) | ○ | ○ | ○ | ○ | ○ |
| | Pencil hardness | F | H | F | F | F |
| | Adhesion | ○ | ○ | ○ | ○ | ○ |
| | Solvent resistance | ○ | ○ | ○ | ○ | ○ |
| | Acid resistance | ○ | ○ | ○ | ○ | ○ |
| | Surface hydrophilicity (°) | 8.9 | 7.9 | 8.0 | 9.4 | 8.8 |
| | Weather resistance (%) | 93 | 94 | 91 | 91 | 92 |
| | Stain resistance (ΔE) | 1.2 | 1.4 | 1.1 | 1.2 | 1.4 |

TABLE 5

| | | Example | | | | |
|---|---|---|---|---|---|---|
| | | 6 | 7 | 8 | 9 | 10 |
| Compounding composition (parts) | Composite resin (ABC-2) | 100 | | | | |
| | Composite resin (ABC-3) | | 100 | 100 | | |
| | Composite resin (ABC-4) | | | | 100 | 100 |
| | TKS-203 | 8.8 | 2 | 10 | 2 | 6 |
| | Deionized water | 97 | 120 | 125 | 124 | 124 |
| | GPTMS | 4.3 | 5.2 | 5.2 | 6.1 | 6.1 |
| Performance of coating film | Appearance of coating film (immediately after preparation) | ○ | ○ | ○ | ○ | ○ |
| | Appearance of coating film (after exposure) | ○ | ○-Δ | ○-Δ | ○ | ○ |
| | Pencil hardness | H | H | H | 2H | 2H |
| | Adhesion | ○ | ○ | ○ | ○ | ○ |
| | Solvent resistance | ○ | ○ | ○ | ○ | ○ |
| | Acid resistance | ○ | ○ | ○ | ○ | ○ |
| | Surface hydrophilicity (°) | 8.0 | 48 | 40 | 9.0 | 8.8 |
| | Weather resistance (%) | 92 | 95 | 90 | 94 | 94 |
| | Stain resistance (ΔE) | 1.0 | 2.1 | 1.8 | 1.8 | 1.7 |

TABLE 6

| | | Example | | | | |
|---|---|---|---|---|---|---|
| | | 11 | 12 | 13 | 14 | 15 |
| Compounding composition (parts) | Composite resin (ABC-4) | 100 | 100 | 100 | | |
| | Composite resin (ABC-5) | | | | 100 | 100 |
| | TKS-203 | 10 | 10 | 10 | 2 | 10 |
| | Deionized water | 124 | 120 | 115 | 124 | 124 |
| | GPTMS | 6.1 | | | 6.1 | 6.1 |
| | EX-614B | | 4.6 | | | |
| | WS-500 | | | 15 | | |
| Performance of coating film | Appearance of coating film (immediately after preparation) | ○ | ○ | ○ | ○ | ○ |
| | Appearance of coating film (after exposure) | ○ | ○ | ○ | ○ | ○ |
| | Pencil hardness | 2H | 2H | 2H | H | H |
| | Adhesion | ○ | ○ | ○ | ○ | ○ |
| | Solvent resistance | ○ | ○ | ○-Δ | ○ | ○ |

TABLE 6-continued

| | Example | | | | |
|---|---|---|---|---|---|
| | 11 | 12 | 13 | 14 | 15 |
| Acid resistance | ○ | ○ | ○ | ○ | ○ |
| Surface hydrophilicity (°) | 8.8 | 9.2 | 11 | 13 | 12 |
| Weather resistance (%) | 92 | 90 | 88 | 94 | 92 |
| Stain resistance (ΔE) | 1.4 | 1.6 | 1.9 | 1.5 | 1.3 |

TABLE 7

| | | Comparative Example | | |
|---|---|---|---|---|
| | | 1 | 2 | 3 |
| Compounding composition (parts) | Composite resin (ABC-2) | 100 | | |
| | Composite resin (ABC-3) | | 100 | |
| | Composite resin (RAB-1) | | | 100 |
| | TKS-203 | | | 10 |
| | Deionized water | 125 | 120 | 124 |
| | GPTMS | 5.2 | 5.2 | 6.1 |
| Performance of coating film | Appearance of coating film (immediately after preparation) | ○ | ○ | ○ |
| | Appearance of coating film (after exposure) | ○ | ○ | X |
| | Pencil hardness | H | H | H |
| | Adhesion | ○ | ○ | ○ |
| | Solvent resistance | ○ | ○ | ○ |
| | Acid resistance | ○ | ○ | ○ |
| | Surface hydrophilicity (°) | 80 | 82 | 60 |
| | Weather resistance (%) | 90 | 90 | 25 |
| | Stain resistance (ΔE) | 3.0 | 3.0 | 4.1 |

Synthesis Example 8

Preparation Example of Water-Based Dispersion of Composite Resin (ABC-6) Particles Encapsulating Fine Particles of Photocatalytic Oxide 120 parts of PnP, 56 parts of PTMS, and 75 parts of DMDMS were fed into a reaction vessel similar to that used in Synthesis Example 1, and the reaction vessel was heated up to 80° C. Subsequently, a mixture containing 20 parts of MMA, 19 parts of BMA, 13 parts of BA, 12 parts of AA, 2 parts of MPTS, 3.3 parts of PnP, and 3.3 parts of TBPEH was added dropwise into the reaction vessel over 4 hours at the same temperature. After the completion of dropwise addition, the resultant was allowed to further react at the same temperature for 2 hours to prepare a polymer (a'-6) with a number average molecular weight of 10,100 and having a combination of a carboxyl group and a hydrolyzable group bonded to a silicon atom. Thereafter, a mixture composed of 0.015 parts of the "A-3" and 43 parts of deionized water was added dropwise over 5 minutes, and the resulting mixture was further stirred for 1 hour at the same temperature to conduct a hydrolytic condensation reaction. As a result, a composite resin (A'B-6) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 262 parts of the methyltrimethoxysilane condensate (c-1) was added thereto, followed by the addition of 56 parts of deionized water and the resulting mixture was further stirred at the same temperature for 16 hours to allow the hydrolytic condensation reaction to proceed, and thereby obtaining a reaction solution containing a composite resin (A'BC-6), in which the aforementioned composite resin (A'B-6) and a polysiloxane segment (C-1) derived from the methyltrimethoxysilane condensate (c-1) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 14 parts of triethylamine (TEA) were added thereto to neutralize the carboxyl group within the composite resin (A'BC-6) to prepare a composite resin (ABC-6). Then, by adding and mixing, due to stirring, 95 parts of a sol formed by dispersing titanium oxide in isopropyl alcohol manufactured by Tayca Corporation under the trade name of "TKD-701" having an average particle size of 6 nm and a titanium oxide content of 17.5%, followed by the addition of 432 parts of deionized water thereto, the composite resin (ABC-6) was dispersed in a water-based medium, thereby obtaining 1,000 parts of a water-based dispersion of the composite resin (ABC-6) particles, in which fine particles of a photocatalytic oxide were encapsulated, with a nonvolatile content of 35.0%.

The storage stability of the obtained water-based dispersion of the composite resin (ABC-6) particles encapsulating fine particles of a photocatalytic oxide was evaluated as follows. The storage stability of the water-based dispersion was 1.0, and thus was satisfactory.

"Storage stability" was evaluated by a value obtained by measuring the viscosity of the obtained water-based dispersion of the composite resin (ABC) particles encapsulating fine particles of a photocatalytic oxide (that is, initial viscosity) and the viscosity thereof after being left to stand at 50° C. for 30 days (that is, viscosity over time), and dividing the value of viscosity over time by the value of initial viscosity (i.e., (viscosity over time)/(initial viscosity)). Roughly speaking, if the storage stability value for the obtained materials is within a range of about 1.0 to 3.0, they may be used as a coating material or the like.

Synthesis Example 9

Preparation Example of Water-Based Dispersion of Composite Resin (ABC-7) Particles Encapsulating Fine Particles of Photocatalytic Oxide 124 parts of PnP, 99 parts of PTMS, and 60 parts of DMDMS were fed into a reaction vessel similar to that used in Synthesis Example 1, and the reaction vessel was heated up to 80° C. Subsequently, a mixture containing 26 parts of MMA, 25 parts of BMA, 17 parts of BA, 16 parts of AA, 2.6 parts of MPTS, 4.4 parts of PnP, and 4.4 parts of TBPEH was added dropwise into the reaction vessel over 4 hours at the same temperature. After the completion of dropwise addition, the resultant was allowed to further react at the same temperature for 2 hours to prepare a polymer (a'-7) with a number average molecular weight of 10,200 and having a combination of a carboxyl group and a hydrolyzable group bonded to a silicon atom. Thereafter, a mixture composed of 0.016 parts of the "A-3" and 45 parts of deionized water was added dropwise over 5 minutes, and the resulting mixture was further stirred for 1 hour at the same temperature to conduct a hydrolytic condensation reaction. As a result, a composite resin (A'B-7) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 227 parts of the methyltrimethoxysilane condensate (c-1) and 20 parts of "TKD-701" were added thereto, followed by the addition of 59 parts of deionized water and the resulting mixture was further stirred and mixed at the same temperature for 16 hours to allow the hydrolytic condensation reaction to proceed, and thereby obtaining a reaction solution containing a composite resin (A'BC-7), in which the aforementioned composite resin (A'B-2) and a polysiloxane segment (C-1) derived from the methyltrimethoxysilane condensate (c-1) were bonded, and fine particles of a photocatalytic oxide.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 18 parts of TEA were added thereto to neutralize the carboxyl group within the composite resin (A'BC-7) to prepare a composite resin (ABC-7). Then by adding 503 parts of deionized water, the composite resin (ABC-7) was dispersed in a water-based medium, thereby obtaining 1,000 parts of a water-based dispersion of the composite resin (ABC-7) particles, in which fine particles of a photocatalytic oxide were encapsulated, with a nonvolatile content of 35.1%.

The storage stability of the obtained water-based dispersion of the composite resin (ABC-7) particles encapsulating fine particles of a photocatalytic oxide was evaluated in a similar manner to that adopted in Synthesis Example 8. As a result, it was 1.0, and thus was satisfactory.

Synthesis Example 10

Preparation Example of Water-Based Dispersion of Composite Resin (ABC-8) Particles Encapsulating Fine Particles of Photocatalytic Oxide 120 parts of PnP, 95 parts of PTMS, and 58 parts of DMDMS were fed into a reaction vessel similar to that used in Synthesis Example 1, and the reaction vessel was heated up to 80° C. Subsequently, a mixture containing 25 parts of MMA, 23 parts of BMA, 17 parts of BA, 16 parts of AA, 2.5 parts of MPTS, 4.2 parts of PnP, and 4.2 parts of TBPEH was added dropwise into the reaction vessel over 4 hours at the same temperature. After the completion of dropwise addition, the resultant was allowed to further react at the same temperature for 2 hours to prepare a polymer (a'-8) with a number average molecular weight of 10,200 and having a combination of a carboxyl group and a hydrolyzable group bonded to a silicon atom. Thereafter, a mixture composed of 0.015 parts of the "A-3" and 43 parts of deionized water was added dropwise over 5 minutes, and the resulting mixture was further stirred for 1 hour at the same temperature to conduct a hydrolytic condensation reaction. As a result, a composite resin (A'B-8) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 218 parts of the methyltrimethoxysilane condensate (c-1) and 95 parts of "TKD-701" were added thereto, followed by the addition of 56 parts of deionized water and the resulting mixture was further stirred and mixed at the same temperature for 16 hours to allow the hydrolytic condensation reaction to proceed, and thereby obtaining a reaction solution containing a composite resin (A'BC-8), in which the aforementioned composite resin (A'B-8) and a polysiloxane segment (C-1) derived from the methyltrimethoxysilane condensate (c-1) were bonded, and fine particles of a photocatalytic oxide.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 18 parts of TEA were added thereto to neutralize the carboxyl group within the composite resin (A'BC-8) to prepare a composite resin (ABC-8). Then by adding 509 parts of deionized water, the composite resin (ABC-8) was dispersed in a water-based medium, thereby obtaining 1,000 parts of a water-based dispersion of the composite resin (ABC-8) particles, in which fine particles of a photocatalytic oxide were encapsulated, with a nonvolatile content of 35.1%.

The storage stability of the obtained water-based dispersion of the composite resin (ABC-8) particles encapsulating fine particles of a photocatalytic oxide was evaluated in a similar manner to that adopted in Synthesis Example 8. As a result, it was 1.0, and thus was satisfactory.

Synthesis Example 11

Preparation Example of Water-Based Dispersion of Composite Resin (ABC-9) Particles Encapsulating Fine Particles of Photocatalytic Oxide 114 parts of PnP, 91 parts of PTMS, and 55 parts of DMDMS were fed into a reaction vessel similar to that used in Synthesis Example 1, and the reaction vessel was heated up to 80° C. Subsequently, a mixture containing 24 parts of MMA, 22 parts of BMA, 16 parts of BA, 15 parts of AA, 2.4 parts of MPTS, 4 parts of PnP, and 4 parts of TBPEH was added dropwise into the reaction vessel over 4 hours at the same temperature. After the completion of dropwise addition, the resultant was allowed to further react at the same temperature for 2 hours to prepare a polymer (a'-9) with a number average molecular weight of 10,200 and having a combination of a carboxyl group and a hydrolyzable group bonded to a silicon atom. Thereafter, a mixture composed of 0.015 parts of the "A-3" and 41 parts of deionized water was added dropwise over 5 minutes, and the resulting mixture was further stirred for 1 hour at the same temperature to conduct a hydrolytic condensation reaction. As a result, a composite resin (A'B-9) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 208 parts of the methyltrimethoxysilane condensate (c-1) and 182 parts of "TKD-701" were added thereto, followed by the addition of 54 parts of deionized water and the resulting mixture was further stirred and mixed at the same temperature for 16 hours to allow the hydrolytic condensation reaction to proceed, and thereby obtaining a reaction solution containing a composite resin (A'BC-9), in which the aforementioned composite resin (A'B-9) and a polysiloxane segment (C-1) derived from the methyltrimethoxysilane condensate (c-1) were bonded, and fine particles of a photocatalytic oxide.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 17 parts of TEA were added thereto to neutralize the carboxyl group within the composite resin (A'BC-9) to prepare a composite resin (ABC-9). Then by adding 515 parts of deionized water, the composite resin (ABC-9) was dispersed in a water-based medium, thereby obtaining 1,000 parts of a water-based dispersion of the composite resin (ABC-9) particles, in which fine particles of a photocatalytic oxide were encapsulated, with a nonvolatile content of 35.2%.

The storage stability of the obtained water-based dispersion of the composite resin (ABC-9) particles encapsulating fine particles of a photocatalytic oxide was evaluated in a similar manner to that adopted in Synthesis Example 8. As a result, it was 1.0, and thus was satisfactory.

Synthesis Example 12

Preparation Example of Water-Based Dispersion of Composite Resin (ABC-10) Particles Encapsulating Fine Particles of Photocatalytic Oxide 107 parts of PnP, 85 parts of PTMS, and 51 parts of DMDMS were fed into a reaction vessel similar to that used in Synthesis Example 1, and the reaction vessel was heated up to 80° C. Subsequently, a mixture containing 22 parts of MMA, 21 parts of BMA, 15 parts of BA, 14 parts of AA, 2.2 parts of MPTS, 3.7 parts of PnP, and 3.7 parts of TBPEH was added dropwise into the reaction vessel over 4 hours at the same temperature. After the completion of dropwise addition, the resultant was allowed to further react at the same temperature for 2 hours to prepare a polymer (a'-10) with a number average molecular weight of 10,000 and having a combination of a carboxyl group and a hydrolyzable group bonded to a silicon atom. Thereafter, a mixture composed of 0.014 parts of the "A-3" and 38 parts of deionized water was added dropwise over 5 minutes, and the resulting mixture was further stirred for 1 hour at the same temperature to conduct a hydrolytic condensation reaction. As a result, a composite resin (A'B-10) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 194 parts of the methyltrimethoxysilane condensate (c-1) was added thereto, followed by the addition of 50 parts of deionized water and the resulting mixture was further stirred at the same temperature for 16 hours to allow the hydrolytic condensation reaction to proceed, and thereby obtaining a reaction solution containing a composite resin (A'BC-10), in which the aforementioned composite resin (A'B-10) and a polysiloxane segment (C-1) derived from the methyltrimethoxysilane condensate (c-1) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 16 parts of TEA were added thereto to neutralize the carboxyl group within the composite resin (A'BC-10) to prepare a composite resin (ABC-10). Then, by adding and mixing, due to stirring, 19 parts of a sol formed by dispersing titanium oxide in isopropyl alcohol manufactured by Tayca Corporation under the trade name of "TKD-702" having an average particle size of 6 nm and a titanium oxide content of 16%, followed by the addition of 554 parts of deionized water thereto, the composite resin (ABC-10) was dispersed in a water-based medium, thereby obtaining 1,000 parts of a water-based dispersion of the composite resin (ABC-10) particles, in which fine particles of a photocatalytic oxide were encapsulated, with a nonvolatile content of 30.0%.

The storage stability of the obtained water-based dispersion of the composite resin (ABC-10) particles encapsulating fine particles of a photocatalytic oxide was evaluated in a similar manner to that adopted in Synthesis Example 8. As a result, it was 1.0, and thus was satisfactory.

Synthesis Example 13

Preparation Example of Water-Based Dispersion of Composite Resin (ABC-11) Particles Encapsulating Fine Particles of Photocatalytic Oxide 102 parts of PnP, 81 parts of PTMS, and 49 parts of DMDMS were fed into a reaction vessel similar to that used in Synthesis Example 1, and the reaction vessel was heated up to 80° C. Subsequently, a mixture containing 21 parts of MMA, 20 parts of BMA, 14 parts of BA, 14 parts of AA, 2.1 parts of MPTS, 3.6 parts of PnP, and 3.6 parts of TBPEH was added dropwise into the reaction vessel over 4 hours at the same temperature. After the completion of dropwise addition, the resultant was allowed to further react at the same temperature for 2 hours to prepare a polymer (a'-11) with a number average molecular weight of 10,100 and having a combination of a carboxyl group and a hydrolyzable group bonded to a silicon atom. Thereafter, a mixture composed of 0.013 parts of the "A-3" and 37 parts of deionized water was added dropwise over 5 minutes, and the resulting mixture was further stirred for 1 hour at the same temperature to conduct a hydrolytic condensation reaction. As a result, a composite resin (A'B-11) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 187 parts of the methyltrimethoxysilane condensate (c-1) was added thereto, followed by the addition of 48 parts of deionized water and the resulting mixture was further stirred at the same temperature for 16 hours to allow the hydrolytic condensation reaction to proceed, and thereby obtaining a reaction solution containing a composite resin (A'BC-11), in which the aforementioned composite resin (A'B-11) and a polysiloxane segment (C-1) derived from the methyltrimethoxysilane condensate (c-1) were bonded, and fine particles of a photocatalytic oxide.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 15 parts of TEA were added thereto to neutralize the carboxyl group within the composite resin (A'BC-11) to prepare a composite resin (ABC-11). Then, by adding and mixing, due to stirring, 89 parts of "TKD-702", followed by the addition of 500 parts of deionized water thereto, the composite resin (ABC-11) was dispersed in a water-based medium, thereby obtaining 1,000 parts of a water-based dispersion of the composite resin (ABC-11) particles, in which fine particles of a photocatalytic oxide were encapsulated, with a nonvolatile content of 30.0%.

The storage stability of the obtained water-based dispersion of the composite resin (ABC-11) particles encapsulating fine particles of a photocatalytic oxide was evaluated in a similar manner to that adopted in Synthesis Example 8. As a result, it was 1.0, and thus was satisfactory.

Synthesis Example 14

Preparation Example of Water-Based Dispersion of Composite Resin (ABC-12) Particles Encapsulating Fine Particles of Photocatalytic Oxide A composite resin (A'B-10) formed of a polymer segment and a polysiloxane segment was obtained in a similar manner to that adopted in Synthesis Example 10, the polymer segment having a combination of a carboxyl group and a hydrolyzable group bonded to a silicon atom, and the polysiloxane segment derived from PTMS and DMDMS. Then 218 parts of the ethyltrimethoxysilane condensate (c-2) was added thereto, followed by the addition of 56 parts of deionized water and the resulting mixture was further stirred at the same temperature for 16 hours to allow the hydrolytic condensation reaction to proceed, and thereby obtaining a reaction solution containing a composite resin (A'BC-12), in which the aforementioned composite resin (A'B-10) and a polysiloxane segment (C-2) derived from the ethyltrimethoxysilane condensate (c-2) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, by adding and mixing, due to stirring, 95 parts of "TKD-701", followed by the addition of 18 parts of TEA thereto, the carboxyl group within the composite resin (A'BC-12) was neutralized to prepare a composite resin (ABC-12). Then by adding 509 parts of deionized water, the composite resin (ABC-12) was dispersed in a water-based medium, thereby obtaining 1,000 parts of a water-based dispersion of the composite resin (ABC-12) particles, in which fine particles of a photocatalytic oxide were encapsulated, with a nonvolatile content of 35.1%.

The storage stability of the obtained water-based dispersion of the composite resin (ABC-12) particles encapsulating fine particles of a photocatalytic oxide was evaluated in a similar manner to that adopted in Synthesis Example 8. As a result, it was 1.0, and thus was satisfactory.

Synthesis Example 15

Preparation Example of Water-Based Dispersion of Composite Resin (ABC-13) Particles Encapsulating Fine Particles of Photocatalytic Oxide 57 parts of PnP, 48 parts of IPA, 51 parts of PTMS, and 31 parts of DMDMS were fed into a reaction vessel similar to that used in Synthesis Example 1, and the reaction vessel was heated up to 80° C. Subsequently, a mixture containing 38 parts of MMA, 80 parts of BMA, 49 parts of 2-EHMA, 18 parts of AA, 6 parts of MPTS, 9 parts of PnP, and 9 parts of TBPEH was added dropwise into the reaction vessel over 4 hours at the same temperature. After the completion of dropwise addition, the resultant was allowed to further react at the same temperature for 2 hours to prepare a polymer (a'-13) with a number average molecular weight of 12,400 and having a combination of a carboxyl group and a hydrolyzable group bonded to a silicon atom. Thereafter, a mixture composed of 0.8 parts of the "A-3" and 23 parts of deionized water was added dropwise over 5 minutes, and the resulting mixture was further stirred for 10 hours at the same temperature to conduct a hydrolytic condensation reaction. As a result, a composite resin (A'B-13) formed of a polymer segment and a polysiloxane segment was obtained, the polymer segment having a combination of a carboxyl group and a hydrolyzable group bonded to a silicon atom, and the polysiloxane segment derived from PTMS and DMDMS. Subsequently, 20 parts of TEA were added to neutralize the carboxyl group within the composite resin (A'B-13) to prepare a composite resin (AB-13), followed by the addition of 197 parts of the methyltrimethoxysilane condensate (c-1), 109 parts of "TKD-701", and 505 parts of deionized water, and the resultant was mixed by stirring for 1 hour at the same temperature. As a result, a composite resin (ABC-13), in which the aforementioned composite resin (AB-13) and a polysiloxane segment (C-1) derived from the methyltrimethoxysilane condensate (c-1) were bonded, was formed by the hydrolytic condensation reaction. Then, the dispersion of the composite resin (ABC-13), where fine particles of a photocatalytic oxide were mixed, in a water-based medium were performed, and thereby obtaining a dispersion of the composite resin (ABC-13) particles, in which fine particles of a photocatalytic oxide were encapsulated.

Then the obtained dispersion was distilled for 2 hours under the conditions of a reduced pressure of 300 down to 10 mmHg and a temperature within a range of 40 to 60° C., by which IPA and the produced methanol and water were removed to obtain 1,000 parts of a water-based dispersion of the composite resin (ABC-13) particles, in which fine particles of a photocatalytic oxide were encapsulated, with a nonvolatile content of 40.0%.

The storage stability of the obtained water-based dispersion of the composite resin (ABC-13) particles encapsulating fine particles of a photocatalytic oxide was evaluated in a similar manner to that adopted in Synthesis Example 8. As a result, it was 1.0, and thus was satisfactory.

Synthesis Example 16

Preparation Example of Water-Based Dispersion of Composite Resin (ABC-14) Particles Encapsulating Fine Particles of Photocatalytic Oxide 34 parts of PnP, 76 parts of IPA, 29 parts of PTMS, and 31 parts of DMDMS were fed into a reaction vessel similar to that used in Synthesis Example 1, and the reaction vessel was heated up to 80° C. Subsequently, a mixture containing 107 parts of MMA, 87 parts of BMA, 50 parts of BA, 15 parts of AA, 8 parts of MPTS, 13 parts of PnP, and 13 parts of TBPEH was added dropwise into the reaction vessel over 4 hours at the same temperature. After the completion of dropwise addition, the resultant was allowed to further react at the same temperature for 2 hours to prepare a polymer (a'-14) with a number average molecular weight of 13,300 and having a combination of a carboxyl group and a hydrolyzable group bonded to a silicon atom. Thereafter, a mixture composed of 0.8 parts of the "A-3" and 23 parts of deionized water was added dropwise over 5 minutes, and the resulting mixture was further stirred for 10 hours at the same temperature to conduct a hydrolytic condensation reaction. As a result, a composite resin (A'B-14) formed of a polymer segment and a polysiloxane segment was obtained, the polymer segment having a combination of a carboxyl group and a hydrolyzable group bonded to a silicon atom, and the polysiloxane segment derived from PTMS and DMDMS. Subsequently, 17 parts of TEA were added to neutralize the carboxyl group within the composite resin (A'B-14) to prepare a composite resin (AB-14), followed by the addition of 109 parts of the methyltrimethoxysilane condensate (c-1), 109 parts of "TKD-701", and 524 parts of deionized water, and the resultant was mixed by stirring for 1 hour at the same temperature. As a result, a composite resin (ABC-14), in which the aforementioned composite resin (AB-14) and a polysiloxane segment (C-1) derived from the methyltrimethoxysilane condensate (c-1) were bonded, was formed by the hydrolytic condensation reaction. Then, the dispersion of the composite resin (ABC-14), where fine particles of a photocatalytic oxide were mixed, in a water-based medium were performed, and thereby obtaining a dispersion of the composite resin (ABC-14) particles, in which fine particles of a photocatalytic oxide were encapsulated.

Then the obtained dispersion was distilled for 2 hours under the conditions of a reduced pressure of 300 down to 10 mmHg and a temperature within a range of 40 to 60° C., by which IPA and the produced methanol and water were removed to obtain 1,000 parts of a water-based dispersion of the composite resin (ABC-14) particles, in which fine particles of a photocatalytic oxide were encapsulated, with a nonvolatile content of 40.3%.

The storage stability of the obtained water-based dispersion of the composite resin (ABC-14) particles encapsulating fine particles of a photocatalytic oxide was evaluated in a similar manner to that adopted in Synthesis Example 8. As a result, it was 1.0, and thus was satisfactory.

Comparative Synthesis Example 2

Preparation Example of Water-Based Dispersion of Composite Resin (RABC-2) Particles for Comparison 126 parts of PnP, 100 parts of PTMS, and 60 parts of DMDMS were fed into a reaction vessel similar to that used in Synthesis Example 1, and the reaction vessel was heated up to 80° C. Subsequently, a mixture containing 26 parts of MMA, 25 parts of BMA, 17 parts of BA, 16 parts of AA, 2.6 parts of MPTS, 4.4 parts of PnP, and 4.4 parts of TBPEH was added dropwise into the reaction vessel over 4 hours at the same temperature. After the completion of dropwise addition, the resultant was allowed to further react at the same temperature for 2 hours to prepare a polymer (Ra'-2) with a number average molecular weight of 10,300 and having a combination of a carboxyl group and a hydrolyzable group bonded to a silicon atom. Thereafter, a mixture composed of 0.016 parts of the "A-3" and 45 parts of deionized water was added dropwise over 5 minutes, and the resulting mixture was further stirred for 1 hour at the same temperature to conduct a hydrolytic condensation reaction. As a result, a composite resin (RA'B-2) formed of a polymer segment and a polysiloxane segment was obtained, the polymer segment having a combination of a carboxyl group and a hydrolyzable group bonded to a silicon atom, and the polysiloxane segment derived from PTMS and DMDMS. Then 229 parts of the methyltrimethoxysilane condensate (c-1) was added thereto, followed by the addition of 59 parts of deionized water and the resulting mixture was further stirred at the same temperature for 16 hours to allow the hydrolytic condensation reaction to proceed, and thereby obtaining a reaction solution containing a composite resin (RA'BC-2), in which the aforementioned composite resin (RA'B-2) and a polysiloxane segment (C-1) derived from the methyltrimethoxysilane condensate (c-1) were bonded.

Subsequently, the obtained reaction solution was distilled for 2 hours under the conditions of a reduced pressure of 300 down to 10 mmHg and a temperature within a range of 40 to 60° C., by which the produced methanol and water were removed. Thereafter, 18 parts of TEA were added thereto to neutralize the carboxyl group within the composite resin (RA'BC-2) to prepare a composite resin (RABC-2). Then by adding 508 parts of deionized water, the composite resin (RABC-2) was dispersed in a water-based medium, thereby obtaining 1,000 parts of a water-based dispersion of the composite resin (RABC-2) particles with a nonvolatile content of 35.0%.

The storage stability of the obtained water-based dispersion of the composite resin (RABC-2) particles was evaluated in a similar manner to that adopted in Synthesis Example 8. As a result, it was 1.0, and thus was satisfactory.

Comparative Synthesis Example 3

Preparation Example of Water-Based Dispersion of Composite Resin (RABC-3) Particles for Comparison 36 parts of PnP, 80 parts of IPA, 31 parts of PTMS, and 32 parts of DMDMS were fed into a reaction vessel similar to that used in Synthesis Example 1, and the reaction vessel was heated up to 80° C. Subsequently, a mixture containing 112 parts of MMA, 92 parts of BMA, 52 parts of BA, 16 parts of AA, 8 parts of MPTS, 14 parts of PnP, and 14 parts of TBPEH was added dropwise into the reaction vessel over 4 hours at the same temperature. After the completion of dropwise addition, the resultant was allowed to further react at the same temperature for 2 hours to prepare a polymer (Ra'-3) with a number average molecular weight of 14,000 and having a combination of a carboxyl group and a hydrolyzable group bonded to a silicon atom. Thereafter, a mixture composed of 0.8 parts of the "A-3" and 24 parts of deionized water was added dropwise over 5 minutes, and the resulting mixture was further stirred for 10 hours at the same temperature to conduct a hydrolytic condensation reaction. As a result, a composite resin (RA'B-3) formed of a polymer segment and a polysiloxane segment was obtained, the polymer segment having a combination of a carboxyl group and a hydrolyzable group bonded to a silicon atom, and the polysiloxane segment derived from PTMS and DMDMS. Subsequently, 18 parts of TEA were added thereto to neutralize the carboxyl group within the composite resin (RA'B-3) to prepare a composite resin (RAB-3), followed by the addition of 114 parts of the methyltrimethoxysilane condensate (c-1) and 550 parts of deionized water thereto, and the resultant was mixed by stirring for 1 hour at the same temperature. As a result, a composite resin (ABC-3), in which the aforementioned composite resin (RAB-3) and a polysiloxane segment (C-1) derived from the methyltrimethoxysilane condensate (c-1) were bonded, was formed by the hydrolytic condensation reaction. Then, the dispersion of the composite resin (RABC-3) in a water-based medium were performed, thereby obtaining a dispersion of the composite resin (RABC-3) particles.

Then the obtained dispersion was distilled for 2 hours under the conditions of a reduced pressure of 300 down to 10 mmHg and a temperature within a range of 40 to 60° C., by which IPA and the produced methanol and water were removed to obtain 1,000 parts of a water-based dispersion of the composite resin (RABC-3) particles with a nonvolatile content of 40.0%.

The storage stability of the obtained water-based dispersion of the composite resin (RABC-3) particles was evaluated in a similar manner to that adopted in Synthesis Example 8. As a result, it was 1.0, and thus was satisfactory. Details of the abovementioned Synthesis Examples 8 to 16 and Comparative Synthesis Examples 2 and 3 are summarized in the following Tables 8 to 11.

TABLE 8

| | | Synthesis Example 8 | Synthesis Example 9 | Synthesis Example 10 |
|---|---|---|---|---|
| Type of composite resin (ABC) | | ABC-6 | ABC-7 | ABC-8 |
| Silane compounds (parts) | PTMS | 56 | 99 | 95 |
| constituting polysiloxane | DMDMS | 75 | 60 | 58 |
| segments (B) and (C) | c-1 | 262 | 227 | 218 |
| | c-2 | | | |
| Vinyl monomers (parts) | MMA | 20 | 26 | 25 |
| constituting polymer segment | BMA | 19 | 25 | 23 |
| (A) | BA | 13 | 17 | 17 |
| | AA | 12 | 16 | 16 |
| | MPTS | 2 | 2.6 | 2.5 |
| Polymerization initiator (parts) | TBPEH | 3.3 | 4.4 | 4.2 |
| Segment (B + C)/(A) (weight ratio) | | 80/20 | 75/25 | 75/25 |
| Segment (C)/(A + B + C) (%) | | 55 | 46 | 46 |
| Fine particles of oxide (D)/(A + B + C) (weight ratio) | | 5/100 | 1/100 | 5/100 |
| Nonvolatile content (%) | | 35.0 | 35.1 | 35.1 |
| Storage Stability | | 1.0 | 1.0 | 1.0 |

TABLE 9

| | | Synthesis Example 11 | Synthesis Example 12 | Synthesis Example 13 |
|---|---|---|---|---|
| Type of composite resin (ABC) | | ABC-9 | ABC-10 | ABC-11 |
| Silane compounds (parts) | PTMS | 91 | 85 | 81 |
| constituting polysiloxane | DMDMS | 55 | 51 | 49 |
| segments (B) and (C) | c-1 | 208 | 194 | 187 |
| | c-2 | | | |
| Vinyl monomers (parts) | MMA | 24 | 22 | 21 |
| constituting polymer segment | BMA | 22 | 21 | 20 |
| (A) | BA | 16 | 15 | 14 |
| | AA | 15 | 14 | 14 |
| | MPTS | 2.4 | 2.2 | 2.1 |
| Polymerization initiator (parts) | TBPEH | 4 | 3.7 | 3.6 |
| Segment (B + C)/(A) (weight ratio) | | 75/25 | 75/25 | 75/25 |
| Segment (C)/(A + B + C) (%) | | 46 | 46 | 46 |
| Fine particles of oxide (D)/(A + B + C) (weight ratio) | | 10/100 | 1/100 | 5/100 |
| Nonvolatile content (%) | | 35.2 | 30.0 | 30.0 |
| Storage Stability | | 1.0 | 1.0 | 1.0 |

TABLE 10

| | | Synthesis Example 14 | Synthesis Example 15 | Synthesis Example 16 |
|---|---|---|---|---|
| Type of composite resin (ABC) | | ABC-12 | ABC-13 | ABC-14 |
| Silane compounds (parts) | PTMS | 95 | 51 | 29 |
| constituting polysiloxane | DMDMS | 58 | 31 | 31 |
| segments (B) and (C) | c-1 | | 197 | 109 |
| | c-2 | 218 | | |
| Vinyl monomers (parts) | MMA | 25 | 38 | 107 |
| constituting polymer segment | BMA | 23 | 80 | 87 |
| (A) | BA | 17 | | 50 |
| | 2-EHMA | | 49 | |
| | AA | 16 | 18 | 15 |
| | MPTS | 2.5 | 6 | 8 |
| Polymerization initiator (parts) | TBPEH | 4.2 | 9 | 13 |
| Segment (B + C)/(A) (weight ratio) | | 75/25 | 50/50 | 30/70 |
| Segment (C)/(A + B + C) (%) | | 46 | 36 | 20 |
| Fine particles of oxide (D)/(A + B + C) (weight ratio) | | 5/100 | 5/100 | 5/100 |
| Nonvolatile content (%) | | 35.0 | 40.0 | 40.3 |
| Storage Stability | | 1.0 | 1.0 | 1.0 |

TABLE 11

| | | Comparative Synthesis Example 2 | Comparative Synthesis Example 3 |
|---|---|---|---|
| Type of composite resin (ABC) | | RABC-2 | RABC-3 |
| Silane compounds (parts) constituting polysiloxane segments (B) and (C) | PTMS | 100 | 31 |
| | DMDMS | 60 | 32 |
| | MTMS | | |
| | c-1 | 229 | 114 |
| | c-2 | | |
| Vinyl monomers (parts) constituting polymer segment (A) | MMA | 26 | 112 |
| | BMA | 25 | 92 |
| | BA | 17 | 52 |
| | 2-HEMA | | |
| | AA | 16 | 16 |
| | MPTS | 2.6 | 8 |
| Polymerization initiator (parts) | TBPEH | 4.4 | 14 |
| Segment (B + C)/(A) (weight ratio) | | 75/25 | 30/70 |
| Segment (C)/(A + B + C) (%) | | 46 | 20 |
| Fine particles of oxide (D)/(A + B + C) (weight ratio) | | 0/100 | 0/100 |
| Nonvolatile content (%) | | 35.0 | 40.0 |
| Storage Stability | | 1.0 | 1.0 |

Examples 16 to 27 and Comparative Examples 4 and 5

Photocatalyst-containing water-based curable coating compositions were obtained by mixing the following components with the compounding compositions shown in Tables 12 to 14: any one of the water-based dispersions of the composite resin (ABC-6) particles to composite resin (ABC-14) particles obtained in Synthesis Examples 8 to 16 or the water-based dispersions of the composite resin (RABC-2) particles and composite resin (RABC-3) particles obtained in Comparative Synthesis Examples 2 and 3; deionized water; 3-glycidoxypropyltrimethoxysilane (GPTMS); an epoxy compound manufactured by Nagase ChemteX Corporation under the trade name of "Denacol EX-614B" and having an epoxy equivalent of 173 g/eq; and a water-soluble resin containing a 1,3-oxazoline group manufactured by Nippon Shokubai Co., Ltd. under the trade name of "Epocros WS-500".

Subsequently, evaluations were made on the cured coating films prepared by using the obtained photocatalyst-containing water-based curable coating compositions in a similar manner to that adopted in Example 1. The results are shown in Tables 12 to 14. Note that the results from Comparative Example 3 described earlier are also shown in Table 14 together with the results from Comparative Examples 4 and 5.

TABLE 12

| | | Example | | | | |
|---|---|---|---|---|---|---|
| | | 16 | 17 | 18 | 19 | 20 |
| Compounding composition (parts) | Composite resin (ABC-6) | 100 | | | | |
| | Composite resin (ABC-7) | | 100 | | | |
| | Composite resin (ABC-8) | | | 100 | 100 | 100 |
| | Deionized water | 100 | 100 | 100 | 100 | 100 |
| | GPTMS | 4.3 | 5.4 | 5.4 | | |
| | EX-614B | | | | 4.1 | |
| | WS-500 | | | | | 15 |
| Performance of coating film | Appearance of coating film (immediately after preparation) | ○ | ○ | ○ | ○ | ○ |
| | Appearance of coating film (after exposure) | ○ | ○ | ○ | ○ | ○ |
| | Pencil hardness | H | H | H | H | H |
| | Adhesion | ○ | ○ | ○ | ○ | ○ |
| | Solvent resistance | ○ | ○ | ○ | ○ | ○ |
| | Acid resistance | ○ | ○ | ○ | ○ | ○ |
| | Surface hydrophilicity (°) | 8.8 | 13 | 7.8 | 8.0 | 8.1 |
| | Weather resistance (%) | 94 | 96 | 92 | 94 | 93 |
| | Stain resistance (ΔE) | 1.7 | 2.1 | 1.5 | 1.6 | 1.6 |

TABLE 13

| | | Example | | | | |
|---|---|---|---|---|---|---|
| | | 21 | 22 | 23 | 24 | 25 |
| Compounding composition (parts) | Composite resin (ABC-9) | 100 | | | | |
| | Composite resin (ABC-10) | | 100 | | | |
| | Composite resin (ABC-11) | | | 100 | | |
| | Composite resin (ABC-12) | | | | 100 | 100 |
| | Deionized water | 100 | 100 | 100 | 100 | 100 |
| | GPTMS | 5.4 | 5.4 | 5.4 | 5.4 | |
| | EX-614B | | | | | 4.1 |

TABLE 13-continued

| | | Example | | | | |
|---|---|---|---|---|---|---|
| | | 21 | 22 | 23 | 24 | 25 |
| Performance of coating film | Appearance of coating film (immediately after preparation) | ○ | ○ | ○ | ○ | ○ |
| | Appearance of coating film (after exposure) | ○ | ○ | ○ | ○ | ○ |
| | Pencil hardness | H | H | H | H | H |
| | Adhesion | ○ | ○ | ○ | ○ | ○ |
| | Solvent resistance | ○ | ○ | ○ | ○ | ○ |
| | Acid resistance | ○ | ○ | ○ | ○ | ○ |
| | Surface hydrophilicity (°) | 6.4 | 14 | 8.3 | 9.0 | 8.8 |
| | Weather resistance (%) | 90 | 96 | 92 | 94 | 92 |
| | Stain resistance (ΔE) | 1.2 | 2.2 | 1.5 | 1.6 | 1.5 |

TABLE 14

| | | Example | | Comparative Example | | |
|---|---|---|---|---|---|---|
| | | 26 | 27 | 4 | 5 | 3 |
| Compounding composition (parts) | Composite resin (ABC-13) | 100 | | | | |
| | Composite resin (ABC-14) | | 100 | | | |
| | Composite resin (RABC-2) | | | 100 | | |
| | Composite resin (RABC-3) | | | | 100 | |
| | Composite resin (RAB-1) | | | | | 100 |
| | TKS-203 | | | | | 10 |
| | Deionized water | 100 | 100 | 100 | 100 | 124 |
| | GPTMS | 6.1 | 5.2 | 5.4 | 5.2 | 6.1 |
| Performance of coating film | Appearance of coating film (immediately after preparation) | ○ | ○ | ○ | ○ | ○ |
| | Appearance of coating film (after exposure) | ○ | ○-Δ | ○ | ○ | X |
| | Pencil hardness | H | H | H | H | H |
| | Adhesion | ○ | ○ | ○ | ○ | ○ |
| | Solvent resistance | ○ | ○-Δ | ○ | ○ | ○ |
| | Acid resistance | ○ | ○ | ○ | ○ | ○ |
| | Surface hydrophilicity (°) | 8.9 | 18 | 75 | 80 | 60 |
| | Weather resistance (%) | 93 | 85 | 90 | 95 | 25 |
| | Stain resistance (ΔE) | 1.8 | 2.7 | 3.4 | 3.2 | 4.1 |

The invention claimed is:

1. A photocatalyst-containing water-based curable coating composition comprising: one of a water-based dispersion (X1) or a water-based dispersion (X2), which includes a water-based medium, a polymer segment (A) having a neutralized acid group, a polysiloxane segment (B) forming a composite resin (AB) by chemically bonding with the polymer segment (A), a polysiloxane segment (C) derived from an alkyltrialkoxysilane condensate (c) with an alkyl group of 1 to 3 carbon atoms, the polysiloxane segment (C) forming a composite resin (ABC) by coupling with the polymer segment (A) and the polysiloxane segment (B) via silicon-oxygen bonds, and fine particles of a photocatalytic oxide (D), wherein the water-based dispersion (X1) is formed by dispersing or dissolving the composite resin (ABC) and dispersing the fine particles of a photocatalytic oxide (D) in the water-based medium, the water-based dispersion (X2) is formed by dispersing resin particles in a water-based medium, the resin particles formed by the encapsulation of the fine particles of a photocatalytic oxide (D) within the composite resin (ABC); and a curing agent (E) for curing the composite resin (ABC);

wherein the amount of the fine particles of a photocatalytic oxide (D) is within the range of 0.1 to 10 parts by weight with respect to 100 parts by weight of the composite resin (ABC).

2. The photocatalyst-containing water-based curable coating composition according to claim 1, wherein the composite resin (ABC) is a composite resin including the polysiloxane segment (B) and the polysiloxane segment (C) so that the total amount of the segments is in a range of 25 to 85% by weight.

3. The photocatalyst-containing water-based curable coating composition according to claim 2, wherein the composite resin (ABC) is a composite resin including the polysiloxane segment (C) in a range of 15 to 60% by weight.

4. The photocatalyst-containing water-based curable coating composition according to claim 1, wherein the composite resin (ABC) is a composite resin in which the polymer segment (A) and the polysiloxane segment (B) are coupled via a bond shown by the following structural formula (S-1):

[Chemical Formula 1]

(S-1)

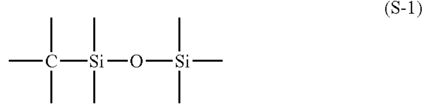

wherein a carbon atom in the structural formula (S-1) constitutes a part of the polymer segment (A) and silicon atoms and an oxygen atom constitute a part of the polysiloxane segment (B).

5. The photocatalyst-containing water-based curable coating composition according to claim 4, wherein the polymer segment (A) is a segment derived from a vinyl-based polymer.

6. The photocatalyst-containing water-based curable coating composition according to claim 1, wherein the alkyltrialkoxysilane condensate (c) is a condensation product obtained by subjecting methyltrimethoxysilane and/or methyltriethoxysilane to a hydrolytic condensation process.

7. The photocatalyst-containing water-based curable coating composition according to claim 1, wherein the curing agent (E) is at least one compound selected from the group consisting of a compound having a hydroxyl group bonded to a silicon atom and/or a hydrolyzable group bonded to a silicon atom; a compound having an epoxy group, and a hydroxyl group bonded to a silicon atom and/or a hydrolyzable group bonded to a silicon atom; a polyisocyanate compound; a blocked polyisocyanate compound; a polyepoxy compound; and a polyoxazoline compound.

8. The photocatalyst-containing water-based curable coating composition according to claim 1, wherein the fine particles of a photocatalytic oxide (D) which is used to form the water-based dispersion (X1) or the water-based dispersion (X2) is sol which is formed by dispersing fine particles of a photocatalytic oxide in an organic solvent.

9. A method for producing a photocatalyst-containing water-based curable coating composition, the method comprising the following (1) to (4):

(1) subjecting a polymer (a'), and organoalkoxysilane (b) and/or a hydrolytic condensation product thereof (b-1) to a hydrolytic condensation process and thereby obtaining a composite resin (A'B), the polymer (a') having a combination of an acid group, a hydroxyl group bonded to a silicon atom, and/or a hydrolyzable group bonded to a silicon atom, the composite resin (A'B) being formed by a chemical bonding between a polymer segment (A') derived from the polymer (a') and a polysiloxane segment (B) derived from the organoalkoxysilane (b);

(2) subjecting the obtained composite resin (A'B) and an alkyltrialkoxysilane condensate (c) with an alkyl group of 1 to 3 carbon atoms to a hydrolytic condensation process and thereby obtaining a composite resin (A'BC), the composite resin (A'BC) being formed by the coupling between a polysiloxane segment (C), which is derived from the alkyltrialkoxysilane condensate (c) with an alkyl group of 1 to 3 carbon atoms, and the polysiloxane segment (B) in the composite resin (A'B) via a silicon-oxygen bond, followed by the neutralization of an acid group within the composite resin (A'BC) by a basic compound to obtain a composite resin (ABC), or neutralizing an acid group within the obtained composite resin (A'B) by a basic compound and thereby obtaining a composite resin (AB), and then hydrolytically condensing an alkyltrialkoxysilane condensate (c) with an alkyl group of 1 to 3 carbon atoms to obtain a composite resin (ABC), the composite resin (ABC) being formed by the coupling between a polysiloxane segment (C), which is derived from the alkyltrialkoxysilane condensate (c) with an alkyl group of 1 to 3 carbon atoms, and the polysiloxane segment (B) in the composite resin (AB) via a silicon-oxygen bond;

(3) mixing the obtained composite resin (ABC) with a water-based medium and thereby dispersing or dissolving the composite resin (ABC), followed by the mixing of fine particles of a photocatalytic oxide (D) or a water-based dispersion thereof so that the amount of the fine particles of a photocatalytic oxide (D) is within the range of 0.1 to 10 parts by weight with respect to 100 parts by weight of the composite resin (ABC), to obtain a water-based dispersion (X1), the water-based dispersion (X1) in which the composite resin (ABC) is dispersed or dissolved and the fine particles of a photocatalytic oxide (D) are dispersed; and (4) mixing the obtained water-based dispersion, which is formed of the composite resin (ABC) and the fine particles of a photocatalytic oxide (D), with a curing agent (E) that cures the composite resin (ABC);

or the method comprising:

above steps (1) and (2) as well as step (3'):

(3') mixing the composite resin (ABC) obtained by the aforementioned (2) with a water-based medium and thereby obtaining a water-based dispersion in which resin particles composed of the composite resin (ABC) are dispersed; and the method also includes, before the aforementioned (3') for dispersing the composite resin (ABC) by mixing the composite resin (ABC) with a water-based medium, mixing fine particles of a photocatalytic oxide (D) with the composite resin (ABC) or a precursor thereof so that the amount of the photocatalytic oxide (D) is within the range of 0.1 to 10 parts by weight with respect to 100 parts by weight of the composite resin (ABC).

10. The method for producing a photocatalyst-containing water-based curable coating composition according to claim 9, wherein the mixing fine particles of a photocatalytic oxide (D) with the composite resin (ABC) or a precursor thereof before the (3') for dispersing the composite resin (ABC) by mixing the composite resin (ABC) with a water-based medium, is carried out by:

a mixing with the composite resin (A'B) and alkyltrialkoxysilane condensate (c) with an alkyl group of 1 to 3 carbon atoms at the time of subjecting the composite resin (A'B) and alkyltrialkoxysilane condensate (c) to a hydrolytic condensation process in the (2);

a mixing with the composite resin (A'BC) after subjecting the composite resin (NB) and alkyltrialkoxysilane condensate (c) to a hydrolytic condensation process in the (2);

a mixing with the composite resin (ABC) after neutralizing the acid group within the composite resin (A'BC) by a basic compound in the (2);

a mixing with the composite resin (AB) and alkyltrialkoxysilane condensate (c) with an alkyl group of 1 to 3 carbon atoms at the time of subjecting the composite resin (AB) and alkyltrialkoxysilane condensate (c) to a hydrolytic condensation process in the (2); or a mixing with the composite resin (ABC) after subjecting the composite resin (AB) and alkyltrialkoxysilane condensate (c) to a hydrolytic condensation process in the (2).

11. The method for producing a photocatalyst-containing water-based curable coating composition according to claim 9, wherein sol formed by dispersing fine particles of a photocatalytic oxide in an organic solvent is used as the fine particles of a photocatalytic oxide (D).

12. The method for producing a photocatalyst-containing water-based curable coating composition according to claim 9, wherein the organoalkoxysilane (b) and the alkyltrialkoxysilane condensate (c) are used so that the total content of the polysiloxane segment (B) and the polysiloxane segment (C) in the composite resin (ABC) is in a range of 25 to 85% by weight.

13. The method for producing a photocatalyst-containing water-based curable coating composition according to claim 12, wherein the alkyltrialkoxysilane condensate (c) is used so that the content of the polysiloxane segment (C) in the composite resin (ABC) is in a range of 15 to 60% by weight.

14. The method for producing a photocatalyst-containing water-based curable coating composition according to claim 9, wherein the organoalkoxysilane (b) is a mono organotrialkoxysilane having an organic group having 4 to 12 carbon atoms bonded to a silicon atom, and/or a diorganodialkoxysilane having two groups of a methyl group bonded to a silicon atom and/or an ethyl group bonded to a silicon atom.

15. The method for producing a photocatalyst-containing water-based curable coating composition according to claim 14, wherein the organic group having 4 to 12 carbon atoms is an alkyl group, a cycloalkyl group, an aryl group, or an aralkyl group.

16. The method for producing a photocatalyst-containing water-based curable coating composition according to claim 9, wherein the polymer (a') is a vinyl-based polymer.

17. The method for producing a photocatalyst-containing water-based curable coating composition according to claim 9, wherein the alkyltrialkoxysilane condensate (c) is a condensation product obtained by subjecting methyltrimethoxysilane and/or methyltriethoxysilane to a hydrolytic condensation process.

18. The method for producing a photocatalyst-containing water-based curable coating composition according to claim 9, wherein the curing agent (E) is at least one compound selected from the group consisting of a compound having a hydroxyl group bonded to a silicon atom and/or a hydrolyzable group bonded to a silicon atom; a compound having an epoxy group, and a hydroxyl group bonded to a silicon atom and/or a hydrolyzable group bonded to a silicon atom; a polyisocyanate compound; a blocked polyisocyanate compound; a polyepoxy compound; and a polyoxazoline compound.

* * * * *